US011086201B2

(12) United States Patent
Kawada

(10) Patent No.: US 11,086,201 B2
(45) Date of Patent: Aug. 10, 2021

(54) CAMERA, ACCESSORY APPARATUS, COMMUNICATION CONTROL METHOD, COMPUTER PROGRAM, AND CAMERA SYSTEM

(71) Applicant: CANON KABUSHIKI KAISHA, Tokyo (JP)

(72) Inventor: Kazutoshi Kawada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/695,744

(22) Filed: Nov. 26, 2019

(65) Prior Publication Data

US 2020/0096840 A1 Mar. 26, 2020

Related U.S. Application Data

(63) Continuation of application No. PCT/JP2018/020655, filed on May 30, 2018.

(30) Foreign Application Priority Data

May 31, 2017 (JP) .............................. JP2017-107397
May 30, 2018 (JP) .............................. JP2018-102936

(51) Int. Cl.
   *G03B 17/14* (2021.01)
   *H04N 5/232* (2006.01)
   *G03B 5/00* (2021.01)

(52) U.S. Cl.
   CPC .............. *G03B 17/14* (2013.01); *G03B 5/00* (2013.01); *H04N 5/23212* (2013.01)

(58) Field of Classification Search
   CPC ........................................................ G03B 17/14
   See application file for complete search history.

(56) References Cited

U.S. PATENT DOCUMENTS 4,811,043 A * 3/1989 Ishimura ................ G03B 7/097
                                                        396/155
8,414,205 B2    4/2013 Okada
                    (Continued)

FOREIGN PATENT DOCUMENTS

CN      101014022 A      8/2007
CN      101321274 A     12/2008
                    (Continued)

OTHER PUBLICATIONS

I2C-bus specification and user manual, NXP Semiconductors, revision date Apr. 4, 2014 (Year: 2014).*
International Preliminary Report on Patentability issued in Intl. Appln. No. PCT/JP2018/020655 dated Dec. 12, 2019. English translation provided.
                    (Continued)

*Primary Examiner* — Clayton E. LaBalle
*Assistant Examiner* — Leon W Rhodes, Jr.
(74) *Attorney, Agent, or Firm* — Rossi, Kimms & McDowell LLP

(57) ABSTRACT

A camera includes a camera controller that provides, using the data communication channel, a first communication for performing a data communication with the plurality of accessory apparatuses, and a second communication for performing a data communication individually with a specific accessory apparatus designated as a communication counterpart by the first communication, output a signal for instructing switching from the first communication to the second communication to the signal transmission channel, performs the first communication at a first communication rate commonly usable for the camera and the plurality of accessory apparatuses, and performs the second communication at a second communication rate commonly usable for the camera and the specific accessory apparatus and equal to or higher than the first communication rate.

17 Claims, 20 Drawing Sheets

(56) References Cited

U.S. PATENT DOCUMENTS

| | | |
|---|---|---|
| 9,001,264 B2 | 4/2015 | Watazawa |
| 10,401,708 B2 * | 9/2019 | Tsujita ................. H04N 5/2252 |
| 10,785,408 B2 * | 9/2020 | Imamura ................ G03B 17/14 |
| 2018/0224720 A1 | 8/2018 | Pan |

FOREIGN PATENT DOCUMENTS

| | | | |
|---|---|---|---|
| JP | H10161006 A | | 6/1998 |
| JP | 2002152576 A | * | 5/2002 |
| JP | 2011175024 A | | 9/2011 |
| JP | 2012037692 A | | 2/2012 |
| JP | 2012053443 A | | 3/2012 |
| WO | 2017068912 A1 | | 4/2017 |
| WO | 2017081914 A1 | | 5/2017 |

OTHER PUBLICATIONS

English translation of Written Opinion issued in Intl. Appln. No. PCT/JP2018/020655 dated Jul. 31, 2018 previously cited in an IDS on Nov. 26, 2019.
Office Action issued in Chinese Appln. No. 201880036161.2 dated Sep. 11, 2020. English translation provided.
NXP Semiconductors. "UM10204 I2C-bus specification and user manual." Rev. 5.0J—Oct. 9, 2012. English translation provided.
International Search Report issued in Intl. Appln. No. PCT/JP2018/020655 dated Jul. 31, 2018. English translation provided.
Written Opinion issued in Intl. Appln. No. PCT/JP2018/020655 dated Jul. 31, 2018.
"UM10204 I2C-bus specification and user manual" NXP Semiconductors N.V. Apr. 2014: pp. 1-64. Rev. 6-4.
Extended European Search Report issued in European Appln. No. 18810023.4 dated Feb. 1, 2021.

* cited by examiner

CORRESPONDING COMMUNICATION RATE INFORMATION (CAMERA) 210

| INITIAL COMMUNI-CATION | | COMMUNI-CATION RATE | |
|---|---|---|---|
| | | 500K [bps] | |
| TABLE NO. | 1 | 1M [bps] | RateB |
| | 2 | 2M [bps] | RateP1 |
| | 3 | 5M [bps] | |
| | 4 | 10M [bps] | |
| | 5 | 20M [bps] | RateP2 |
| | 6 | 30M [bps] | |

CORRESPONDING COMMUNICATION RATE INFORMATION (ADAPTER) 304

| INITIAL COMMUNI-CATION | | COMMUNI-CATION RATE | |
|---|---|---|---|
| | | 500K [bps] | |
| TABLE NO. | 1 | 1M [bps] | RateB |
| | 2 | 2M [bps] | RateP1 |
| | 3 | 3M [bps] | |
| | 4 | 4M [bps] | |

CORRESPONDING COMMUNICATION RATE INFORMATION (LENS) 132

| INITIAL COMMUNI-CATION | | COMMUNI-CATION RATE | |
|---|---|---|---|
| | | 500K [bps] | |
| TABLE NO. | 1 | 1M [bps] | RateB |
| | 2 | 5M [bps] | |
| | 3 | 10M [bps] | |
| | 4 | 15M [bps] | |
| | 5 | 20M [bps] | RateP2 |

FIG. 12

RATEP2 CANDIDATE LIST

| TABLE NO. | COMMUNICATION RATE |
|---|---|
| 1 | 1M [bps] |
| 2 | 5M [bps] |
| 3 | 10M [bps] |
| 4 | 20M [bps] |

COMMUNICATION NUMBER COMMUNICATION RATE INFORMATION (CAMERA)

| ACCESSORY CONNECTION NUMBER | UPPER LIMIT COMMUNICATION RATE |
|---|---|
| 1 | 30M [bps] |
| 2 | 15M [bps] |
| 3 | 10M [bps] |
| 4 | 5M [bps] |
| 5 | 1M [bps] |

FIG. 13

LOAD COMMUNICATION RATE INFORMATION (CAMERA)

| TOTAL COMMUNICATION LOAD AMOUNT | UPPER LIMIT COMMUNICATION RATE |
|---|---|
| 100 OR SMALLER | 30M [bps] |
| 200 OR SMALLER | 20M [bps] |
| 300 OR SMALLER | 10M [bps] |
| 400 OR SMALLER | 5M [bps] |
| 500 OR SMALLER | 1M [bps] |

COMMUNICATION LOAD INFORMATION (ADAPTER)

| COMMUNICATION LOAD AMOUNT |
|---|
| 150 |

COMMUNICATION LOAD INFORMATION (LENS)

| COMMUNICATION LOAD AMOUNT |
|---|
| 170 |

FIG. 14

CAMERA, ACCESSORY APPARATUS, COMMUNICATION CONTROL METHOD, COMPUTER PROGRAM, AND CAMERA SYSTEM

CROSS-REFERENCE TO RELATED APPLICATIONS

This application is a Continuation of International Patent Application No. PCT/JP2018/020655, filed on May 30, 2018, which claims the benefit of Japanese Patent Applications Nos. 2017-107397, filed on May 31, 2017, and 2018-102936, filed on May 30, 2018, each of which is hereby incorporated by reference herein in their entirety.

BACKGROUND OF THE INVENTION

Field of the Invention

The present invention relates to a camera system including a camera and an accessory apparatus, such as an interchangeable lens or an adapter, which can communicate with each other.

Description of the Related Art

In an interchangeable lens type camera system including a camera to which an interchangeable lens is detachably attachable, a communication is performed for the camera to control the operation of the interchangeable lens and for the interchangeable lens to provide the camera with data necessary for its control and imaging. In particular, in imaging a recording use motion image and a live-view display use motion image with the interchangeable lens, a smooth lens control is required at an imaging cycle, so it is necessary to synchronize the imaging timing of the camera and the control timing of the interchangeable lens with each other. Thus, the camera needs to complete a data reception from the interchangeable lens and a transmission of a command, such as a variety of instructions and requests, to the interchangeable lens within the imaging cycle. However, as a data amount received by the camera from the interchangeable lens becomes larger or the imaging cycle becomes shorter (or the frame rate becomes higher), a communication of a large amount of data at higher speed is required.

An adapter such as a wide converter or a teleconverter (extender) may be connected between the camera and the interchangeable lens, and this type of adapter also communicates with the camera similar to the interchangeable lens. Hence, the camera system requires a communication system in which the camera can perform a one-to-many communication with a plurality of accessory apparatuses including the interchangeable lens and the adapter. As a communication method for realizing such a one-to-many communication, there is an $I^2$ communication method disclosed in NXP materials: $I^2$ bus specification and user manual Rev5.0J-2-Oct. 9, 2012 [May 20, 2017 Internet search URL: http://www.nxp.com/documents/user manual/UM10204 JA.pdf].

However, the $I^2$ communication system is premised on the clock synchronous communication, and is not compatible with the asynchronous communication that is generally employed for expediting the communication. On the other hand, the asynchronous communication needs to match the communication speed between the communication master and the communication slave. At this time, in order to secure a sufficient high-speed communication in a camera system in which a variety of accessory apparatuses having different usable communication speeds are used, it is necessary to select an optimal communication speed according to the accessory apparatus used.

SUMMARY OF THE INVENTION

The present invention provides a camera system that enables a communication between a camera and each accessory apparatus as fast as possible even when a plurality of accessory apparatuses having different usable communication speeds are connected to the camera.

A camera according to one aspect of the present invention usable while a plurality of accessory apparatuses are connected to the camera includes a camera controller configured to control a communication with the plurality of accessory apparatuses using a signal transmission channel used for a signal transmission between the camera and the plurality of accessory apparatuses, and a data communication channel used for a data communication between the camera and the plurality of accessory apparatuses. The camera controller is configured to provide, using the data communication channel, a first communication for performing a data communication with the plurality of accessory apparatuses, and a second communication for performing a data communication individually with a specific accessory apparatus designated as a communication counterpart by the first communication, outputs a signal for instructing switching from the first communication to the second communication to the signal transmission channel, performs the first communication at a first communication rate commonly usable for the camera and the plurality of accessory apparatuses, and performs the second communication at a second communication rate commonly usable for the camera and the specific accessory apparatus and equal to or higher than the first communication rate.

An accessory apparatus according to another aspect of the present invention among a plurality of accessory apparatuses connectable to a camera usable while the plurality of accessory apparatuses are connected to the camera includes an accessory controller configured to control a communication with the camera using a signal transmission channel used for a signal transmission between the camera and the plurality of accessory apparatuses, and a data communication channel used for a data communication between the camera and the plurality of accessory apparatuses. The accessory controller is configured to perform a first communication for performing a data communication performed between the camera and the plurality of accessory apparatuses, and a second communication for performing a data communication individually with the camera when the accessory apparatus is designated as a specific accessory apparatus that is a communication counterpart by the first communication, detects a signal output from the camera to the signal transmission channel and instructing switching from the first communication to the second communication, performs the first communication at a first communication rate commonly usable for the camera and the plurality of accessory apparatuses, and performs the second communication at a second communication rate commonly usable for the camera and the accessory apparatus and equal to or higher than the first communication rate.

A control method of a camera according to another aspect of the present invention usable while a plurality of accessory apparatuses are connected to the camera that is connected to a signal transmission channel used for a signal transmission between the camera and the plurality of accessory apparatuses, and a data communication channel used for a data communication between the camera and the plurality of accessory apparatuses includes the steps of causing the camera to provide a first communication for performing a data communication with the plurality of accessory apparatuses using the data communication channel, and causing the camera to provide a second communication for performing a data communication individually with a specific accessory apparatus designated as a communication counterpart by the first communication using the data communication channel. A signal for instructing switching from the first communication to the second communication is output to the signal transmission channel, the first communication is performed at a first communication rate commonly usable for the camera and the plurality of accessory apparatuses, and the second communication is performed at a second communication rate commonly usable for the camera and the specific accessory apparatus and equal to or higher than the first communication rate.

A control method according to another aspect of the present invention of an accessory apparatus among a plurality of accessory apparatuses connectable to a camera usable while the plurality of accessory apparatuses are connected to the camera, the accessory apparatus being connected to a signal transmission channel used for a signal transmission between the camera and the plurality of accessory apparatuses, and a data communication channel used for a data communication between the camera and the plurality of accessory apparatuses includes the steps of causing the accessory apparatus to perform a first communication performed between the camera and the plurality of accessory apparatuses using the data communication channel, and causing the accessory apparatus to perform a second communication for a data communication individually with the camera when the accessory apparatus is designated as a specific accessory apparatus that is a communication counterpart by the first communication. The accessory apparatus is caused to detect a signal output from the camera to the signal transmission channel and instructing switching from the first communication to the second communication, the accessory apparatus is caused to perform the first communication at a first communication rate commonly usable for the camera and the plurality of accessory apparatuses, and the accessory apparatus is caused to perform the second communication at a second communication rate commonly usable for the camera and the accessory apparatus and equal to or higher than the first communication rate.

A communication control program that is a computer program that causes a computer in a camera or an accessory apparatus to execute the above communication control method also constitutes another aspect of the present invention.

A camera system includes a camera usable while the plurality of accessory apparatuses are connected to the camera, and at least one accessory apparatus among the plurality of accessory apparatuses. The camera includes a camera controller configured to control a communication with the plurality of accessory apparatuses using a signal transmission channel used for a signal transmission between the camera and the plurality of accessory apparatuses, and a data communication channel used for a data communication between the camera and the plurality of accessory apparatuses. The accessory apparatus includes an accessory controller configured to control a communication with the camera using the signal transmission channel and the data communication channel. The camera controller is configured to provide, using the data communication channel, a first communication for performing a data communication with the plurality of accessory apparatuses, and a second communication for performing a data communication individually with a specific accessory apparatus designated as a communication counterpart by the first communication, and outputs a signal for instructing switching from the first communication to the second communication to the signal transmission channel. The accessory controller is configured to perform the first communication and the second communication when the accessory apparatus is designated as a specific accessory apparatus that is a communication counterpart by the first communication, and detects a signal output from the camera controller to the signal transmission channel and instructing switching from the first communication to the second communication. The camera controller and the accessory controller perform the first communication at a first communication rate commonly usable for the camera and the plurality of accessory apparatuses, and perform the second communication at a second communication rate commonly usable for the camera and the accessory apparatus and equal to or higher than the first communication rate.

Further features of the present invention will become apparent from the following description of exemplary embodiments with reference to the attached drawings.

BRIEF DESCRIPTION OF THE DRAWINGS

FIG. 12 is a diagram illustrating a format of corresponding communication rate information according to the first embodiment.

FIG. 13 is a diagram illustrating a format of connection number communication rate information according to the first embodiment.

FIG. 14 is a diagram illustrating a format of load communication rate information according to the first embodiment.

DESCRIPTION OF THE EMBODIMENTS

Referring now to the accompanying drawings, a description will be given of embodiments according to the present invention.

First Embodiment

Figure 1:
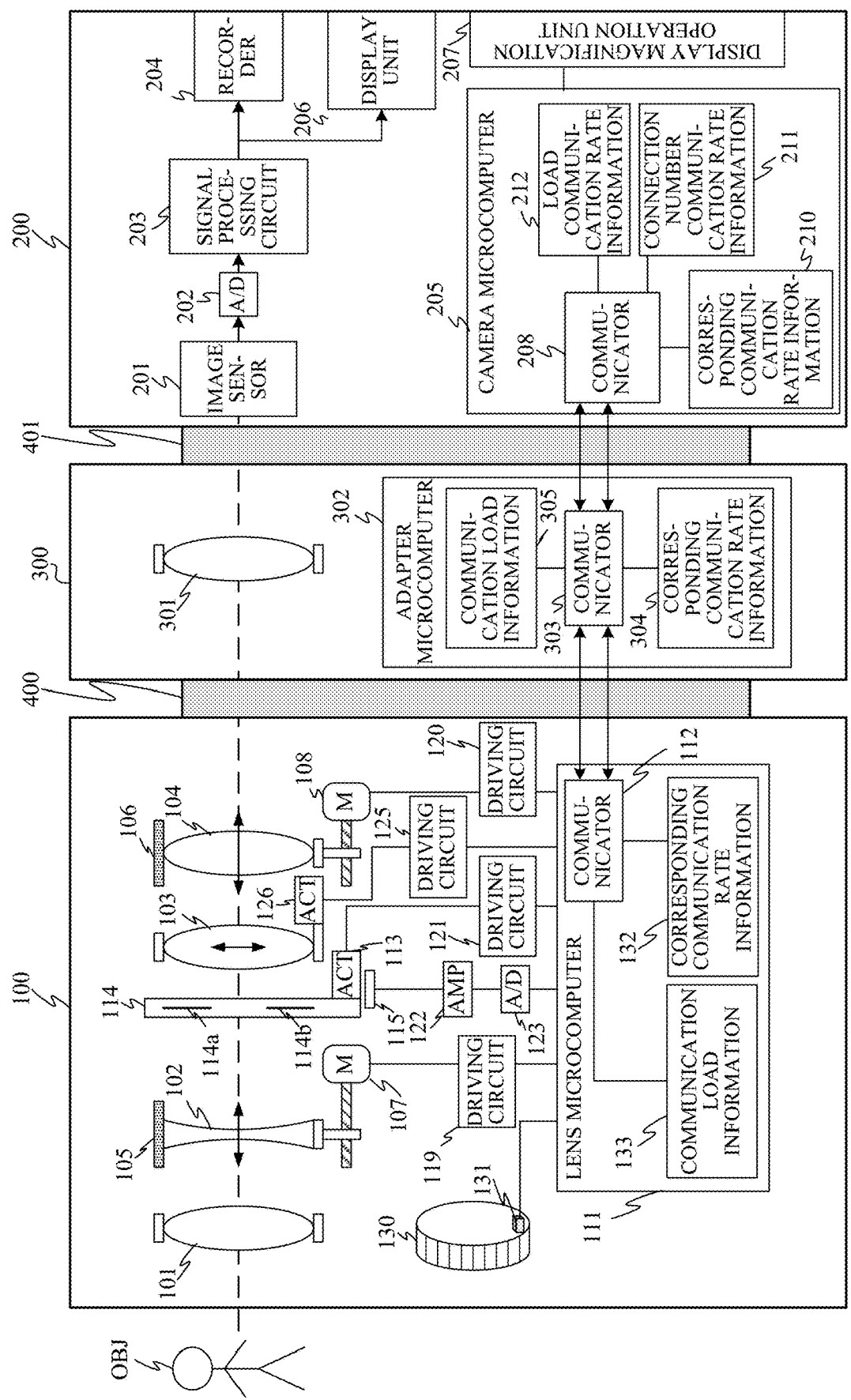
FIG. 1 is a block diagram illustrating a configuration of a camera system according to a first embodiment of the present invention.

FIG. 1 illustrates a configuration of an imaging system (referred to as a camera system hereinafter) according to a first embodiment of the present invention that includes a camera 200, and an interchangeable lens 100 and an intermediate adapter apparatus (simply referred to as an adapter hereinafter) 300 each serving as an accessory apparatus. The camera 200 according to this embodiment is usable while both the interchangeable lens 100 and the adapter 300 are connected to the camera 200.

While FIG. 1 illustrates an illustrative camera system in which a single adapter 300 is connected between the camera 200 and the interchangeable lens 100, a plurality of adapters may be connected in series between the camera 200 and the interchangeable lens 100.

The camera system according to this embodiment performs communications among the camera 200, the interchangeable lens 100, and the adapter 300 using a plurality of communication methods. The camera 200, the interchangeable lens 100, and the adapter 300 transmit control commands and data (information) through their respective communicators. In addition, each communicator supports a plurality of communication methods, and can select an optimal communication method in a variety of situations by switching to the common communication method in synchronization with each other according to the type of data to be communicated and the purpose of communication.

A description will now be given of a more specific configuration of the interchangeable lens 100, the camera 200, and the adapter 300.

The interchangeable lens 100 and the adapter 300 are mechanically and electrically connected via a mount 400 as a coupling mechanism. Similarly, the adapter 300 and the camera 200 are mechanically and electrically connected via a mount 401 as a coupling mechanism. The interchangeable lens 100 and the adapter 300 obtain the electric power from the camera 200 through power supply terminal portions (not shown) provided to the mounts 400 and 401. Then, the power is suppled which is necessary for operations of a variety of actuators, a lens microcomputer 111, and an adapter microcomputer 302 as described later. The interchangeable lens 100, the camera 200, and the adapter 300 communicate with each other through communication terminal portions (illustrated in FIG. 2) provided to the mounts 400 and 401.

The interchangeable lens 100 includes an imaging optical system. The imaging optical system includes, in order from an object OBJ side, a field lens 101, a magnification varying lens 102 that changes a magnification, a diaphragm unit 114 that adjusts a light amount. The imaging optical system further includes an image stabilization lens 103 configured to reduce (correct) an image blur, and a focus lens 104 used for focusing.

The zoom lens 102 and the focus lens 104 are held by lens holding frames 105 and 106, respectively. The lens holding frames 105 and 106 are movably guided in an optical axis direction (indicated by a broken line in the figure) by unillustrated guide shafts, and are driven in the optical axis direction by stepping motors 107 and 108. The stepping motors 107 and 108 move the zoom lens 102 and the focus lens 104 in synchronization with a driving pulse, respectively.

The image stabilization lens 103 shifts in a direction orthogonal to the optical axis in the imaging optical system to reduce image blurs caused by a camera shake such as a manual shake.

A lens microcomputer 111 serves as a lens controller (accessory controller) that controls the operation of each component in the interchangeable lens 100. The lens microcomputer 111 receives a control command and a transmission request command transmitted from the camera 200 via a lens communicator (accessory communicator) 112 including a lens communication interface circuit. The lens microcomputer 111 performs a lens control corresponding to the control command, and transmits lens data corresponding to the transmission request command to the camera 200 via the lens communicator 112.

The lens microcomputer 111 outputs a driving signal to a zoom driving circuit 119 and a focus driving circuit 120 in response to a command relating to a magnification variation and focusing among the control commands to drive the stepping motors 107 and 108. This configuration can provide zoom processing for controlling the magnification varying operation with the zoom lens 102 and AF (autofocus) processing for controlling the focusing operation with the focus lens 104.

The diaphragm unit 114 includes aperture blades 114a and 114b. The states (positions) of the aperture blades 114a and 114b are detected by a Hall element 115. The output from the Hall element 115 is input to the lens microcomputer 111 via an amplifier circuit 122 and an A/D conversion circuit 123. The lens microcomputer 111 outputs a driving signal to a diaphragm driving circuit 121 based on an input signal from the A/D conversion circuit 123 to drive a diaphragm actuator 113. Thereby, a light amount adjustment operation by the diaphragm unit 114 is controlled.

The lens microcomputer 111 controls an image stabilization actuator (voice coil motor etc.) 126 via an image stabilization driving circuit 125 in accordance with the camera shake detected by a shake sensor (not shown) such as a vibration gyro provided in the interchangeable lens 100. Thereby, the image stabilization processing for controlling the shift operation (image stabilization operation) of the image stabilization lens 103 is performed.

The interchangeable lens 100 includes a manual operation ring 130 and an operation ring detector 131. The operation ring detector 131 includes, for example, two photo-interrupters that output two-phase signals in accordance with a rotation of the manual operation ring 130. The lens microcomputer 111 can detect the rotational operation amount of the manual operation ring 130. The lens microcomputer 111 can notify the camera microcomputer 205 of the rotational operation amount of the manual operation ring 130 via the lens communicator 112.

The adapter 300 includes, for example, an extender for changing a focal length, and includes a magnification varying lens 301 and an adapter microcomputer 302. The adapter microcomputer 302 is an adapter controller (accessory controller) that controls the operation of each component in the adapter 300. The adapter microcomputer 302 receives a control command and a transmission request command transmitted from the camera 200 via an adapter communicator (accessory communicator) 303 including a communication interface circuit. The adapter microcomputer 302 performs an adapter control corresponding to the control command, and transmits adapter data corresponding to the transmission request command to the camera 200 via the adapter communicator 303.

The camera 200 includes an image sensor 201, such as a CCD sensor or a CMOS sensor, an A/D conversion circuit 202, a signal processing circuit 203, a recorder 204, a camera microcomputer 205, and a display unit 206.

The image sensor 201 photoelectrically converts an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various types of image processing for the digital signal from the A/D conversion circuit 202 and generates an image signal. The signal processing circuit 203 also generates, from the image signal, focus information indicating a contrast state of an object image (focus state of the imaging optical system) and luminance information indicating an exposure state. The signal processing circuit 203 outputs the image signal to the display unit 206, and the display unit 206 displays the image signal as a live-view image used for a confirmation of a composition, a focus state, etc.

A camera microcomputer 205 as a camera controller controls the camera 200 in accordance with an input from a camera operation member, such as an unillustrated imaging instructing switch and a variety of setting switches. The camera microcomputer 205 transmits a control command relating to the magnification varying operation of the zoom lens 102 to the lens microcomputer 111 in accordance with the operation of an unillustrated zoom switch via the camera communicator 208 including the communication interface circuit. Moreover, the camera microcomputer 205 transmits, to the lens microcomputer 111 via the camera communicator 208, a control command relating to the light amount adjustment operation of the diaphragm unit 114 in accordance with the luminance information and the focusing operation of the focus lens 104 in accordance with the focus information. The camera microcomputer 205 transmits a transmission request command for acquiring the control information and status information of the interchangeable lens 100 to the lens microcomputer 111, if necessary. Further, the camera microcomputer 205 transmits to the adapter microcomputer 302 a transmission request command for acquiring the control information and status information of the adapter 300.

Figure 2:
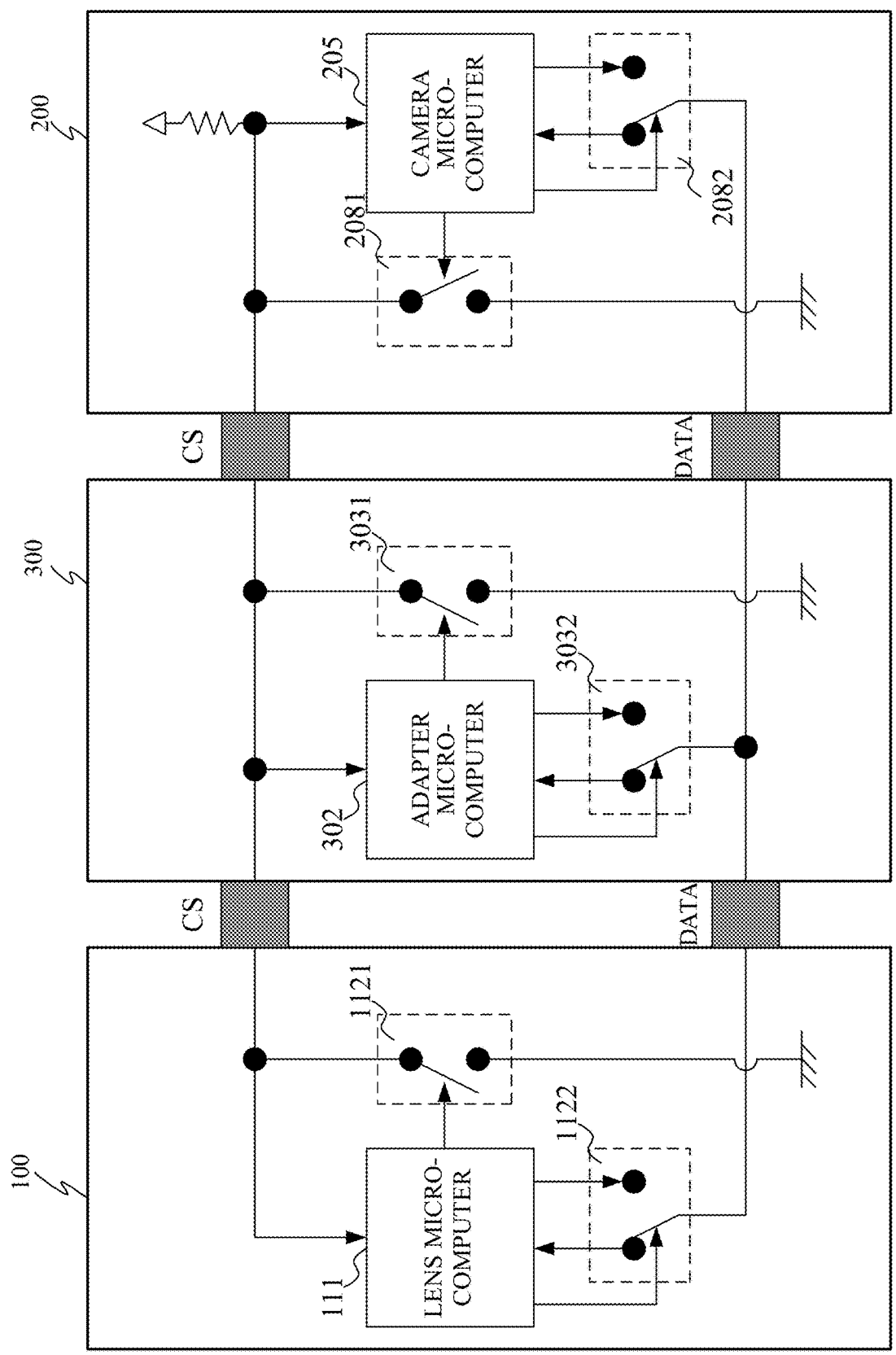
FIG. 2 is a diagram illustrating communication circuits of a camera (camera microcomputer), an interchangeable lens (lens microcomputer), and an adapter (adapter microcomputer) according to the first embodiment.

Referring now to FIG. 2, a description will be given of a communication circuit configured among the camera 200 (camera microcomputer 205), the interchangeable lens 100 (lens microcomputer 111), and the adapter 300 (adapter microcomputer 302). The camera microcomputer 205, the lens microcomputer 111, and the adapter microcomputer 302 achieve communications using signal lines connected via communication terminal portions provided on the mounts 400 and 401.

The signal lines include a signal line (first signal line corresponding to a signal transmission channel) CS that communicates a signal for a communication control, and a signal line (second signal corresponding to a data communication channel) DATA for a data communication.

The signal line CS is connected to the camera microcomputer 205, the adapter microcomputer 302, and the lens microcomputer 111. Therefore, the camera microcomputer 205, the adapter microcomputer 302, and the lens microcomputer 111 can detect high and low levels of the state of the signal line CS. The signal line CS is pulled up to an unillustrated power source in the camera 200. The signal line CS can be connected to a ground GND (open drain connection) via a ground switch 1121 in the interchangeable lens 100, a ground switch 2081 in the camera 200, and a ground switch 3031 in the adapter 300.

Due to this configuration, the camera microcomputer 205, the adapter microcomputer 302, and the lens microcomputer 111 can put the signal line CS into low by turning on (connecting) the ground switches 2081, 1121, and 3031, respectively. In addition, the camera microcomputer 205, the adapter microcomputer 302, and the lens microcomputer 111 can put the signal line CS into high by turning off (disconnect) the ground switches 2081, 1121, and 3031, respectively. A detailed description will be given of a communication control signal (instruction or notification) transmitted through the signal line CS and its output processing.

The signal line DATA is a single-wire bidirectional data communication line that can be used by switching the data transmission direction. The signal line DATA is connectable to the lens microcomputer 111 via an input/output switch 1122 in the interchangeable lens 100, and connectable to the camera microcomputer 205 via an input/output switch 2082 in the camera 200. The signal line DATA is connectable to the adapter microcomputer 302 via an input/output switch 3032 in the adapter 300. Each microcomputer includes a CMOS type data output part for transmitting data and a CMOS type data input part for receiving data (none of which is shown). Each microcomputer can select whether the signal line DATA is connected to the data output part or the data input part, by switching the input/output switch.

Each of the camera microcomputer 205, the adapter microcomputer 302, and the lens microcomputer 111 when transmitting data sets the input/output switch so as to connect the signal line DATA to the data output part. Each of the camera microcomputer 205, the adapter microcomputer 302, and the lens microcomputer 111 when receiving data sets an input/output switch so as to connect the signal line DATA to the data input part. Details of the input/output switching processing of the signal line DATA will be described later.

FIG. 2 illustrates an illustrative communication circuit, but another communication circuit may be used. For example, the signal line CS may be pulled down to GND in the camera 200 and connected to an unillustrated power supply via the ground switch 1121 in the interchangeable lens 100, the ground switch 2081 in the camera 200, and the ground switch 3031 in the adapter 300. In the interchangeable lens 100, the camera 200, and the adapter 300, the signal line DATA may be always connected to the data input part, and the connection and disconnection between the signal line DATA and the data output part may be selected by a switch.

[Communication Data Format]

Figure 3:
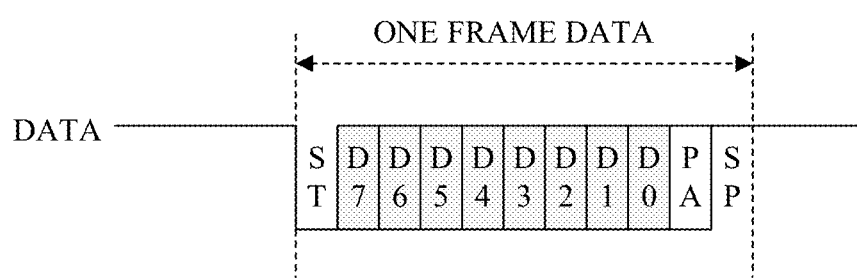
FIG. 3 is a diagram illustrating a communication format according to the first embodiment.

Referring now to FIG. 3, a description will be given of a format of communication data exchanged among the camera 200 (camera microcomputer 205), the interchangeable lens 100 (lens microcomputer 111), and the adapter 300 (adapter microcomputer 302). This communication data format is common to the broadcast communication, which is a first communication described later, and the P2P communication, which is a second communication. A description will now be given of a communication data format in a so-called asynchronous communication in which a communication speed used for a communication among the camera microcomputer 205, the lens microcomputer 111, the adapter microcomputer 302 are previously determined and the transmission and reception are performed at a communication bit rate in accordance with the protocol.

Initially, in a non-transmission state that transmits no data, the signal level is maintained high. Next, in order to notify the data reception side of a start of the data transmission, the signal level is set to be low for one bit period. This one bit period will be referred to as a start bit ST. Next, one-byte data is transmitted for an eight-bit period from the next second bit to the ninth bit. The bit arrangement of the data starts with the most significant data D7 in the MSB first format, continues with data D6, data D5, ..., Data D1, and ends with the least significant data D0. In the tenth bit, one-bit parity PA information is added, and one frame level starting from the start bit ST is completed by finally putting the signal level into high during a stop bit SP period indicating the end of the transmission data.

FIG. 3 illustrates an illustrative communication data format, but another communication data format may be used. For example, the bit arrangement of the data may be the LSB first or the nine-bit length, or no parity PA information need not be added. The communication data format may be switched between broadcast communication and the P2P communication.

[Broadcast Communication]

Next follows a description of the broadcast communication (first communication). The broadcast communication is the one-to-many communication in which one of the camera microcomputer 205, the lens microcomputer 111, and the adapter microcomputer 302 transmits data to the other two at the same time (i.e., simultaneous transmission). This broadcast communication is performed using the signal line CS and the signal line DATA. A communication mode in which the broadcast communication is performed is also referred to as a broadcast communication mode (first communication mode).

Figure 4:
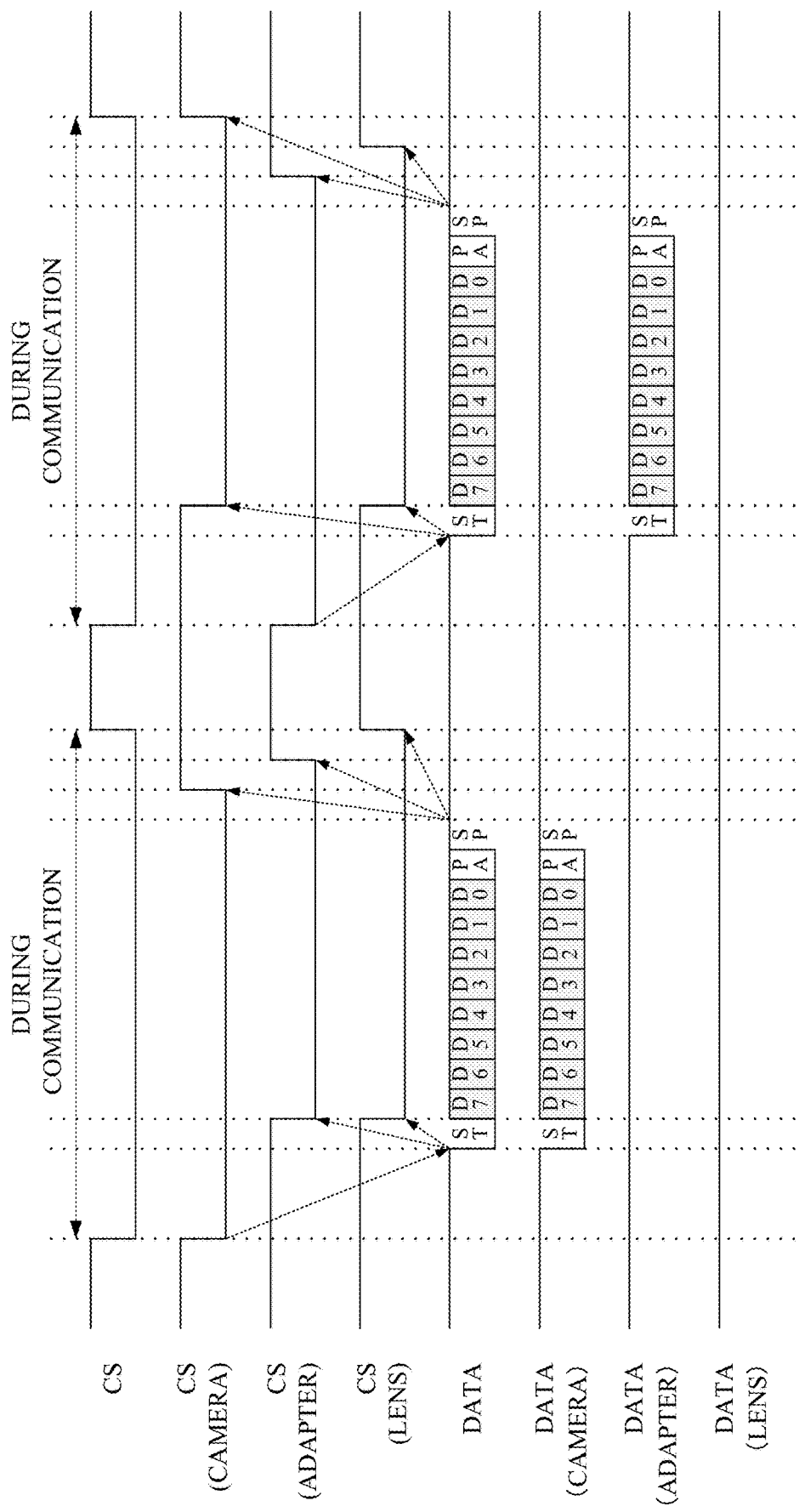
FIG. 4 is a diagram illustrating communication waveforms in a broadcast communication according to the first embodiment.

FIG. 4 illustrates signal waveforms in the broadcast communication among the camera microcomputer 205, the lens microcomputer 111, and the adapter microcomputer 302. Here is an example in which the adapter microcomputer 302 performs the broadcast communication to the camera microcomputer 205 and the lens microcomputer 111 in response to the broadcast communication from the camera microcomputer 205 to the lens microcomputer 111 and the adapter microcomputer 302.

Initially, the camera microcomputer 205 as a communication master starts the low output to the signal line CS in order to notify the lens microcomputer 111 and the adapter microcomputer 302 as communication slaves that the broadcast communication is to be started. Next, the camera microcomputer 205 outputs data to be transmitted, to the signal line DATA. On the other hand, the lens microcomputer 111 and the adapter microcomputer 302 start the low output to the signal line CS when detecting the start bit ST input from the signal line DATA. At this time, since the camera microcomputer 205 has already started the low output to the signal line CS, the signal level of the signal line CS does not change.

Thereafter, the camera microcomputer 205 stops the low output to the signal line CS after the stop bit SP is output. On the other hand, after receiving the stop bit SP input from the signal line DATA, the lens microcomputer 111 and the adapter microcomputer 302 analyze the received data and perform internal processing associated with the received data. When the preparation for receiving the next data is completed, the low output to the signal line CS is stopped. As described above, the signal level of the signal line CS becomes high when all of the camera microcomputer 205, the lens microcomputer 111, and the adapter microcomputer 302 stop the low output to the signal line CS. Thus, each of the camera microcomputer 205, the lens microcomputer 111, and the adapter microcomputer 302 can confirm that the signal level of the signal line CS becomes high after stopping the low output to the signal line CS. When each of the camera microcomputer 205, the lens microcomputer 111, and the adapter microcomputer 302 confirms that the signal level of the signal line CS has become high, it can determine that the current communication processing is completed and it is ready for the next communication.

Next, when confirming that the signal level of the signal line CS has returned to the high level, the adapter microcomputer 302 starts the low output to the signal line CS in order to notify the camera microcomputer 205 and the lens microcomputer 111 that the broadcast communication is to be started.

Next, the adapter microcomputer 302 outputs the data to be transmitted, to the signal line DATA. The camera microcomputer 205 and the lens microcomputer 111 start the low output to the signal line CS when detecting the start bit ST input from the signal line DATA. Since the adapter microcomputer 302 has already started the low output to the signal line CS at this time, the signal level propagated to the signal line CS does not change. Thereafter, the adapter microcomputer 302 stops the low output to the signal line CS when it completes outputting the stop bit SP. On the other hand, after receiving up to the stop bit SP input from the signal line DATA, the camera microcomputer 205 and the lens microcomputer 111 analyze the received data and perform internal processing associated with the received data. Then, after the preparation for receiving the next data is completed, the low output to the signal line CS is stopped.

As described above, the signal transmitted through the signal line CS in the broadcast communication serves as a signal indicating the start (execution) and the ongoing execution of the broadcast communication.

FIG. 4 illustrates an illustrative broadcast communication, but another broadcast communication may be performed. For example, the data transmitted in a single broadcast communication may be one-byte data as illustrated in FIG. 4, but may be two-byte or three-byte data. The broadcast communication may be a one-way communication from the camera microcomputer 205 serving as a communication master to the lens microcomputer 111 and adapter microcomputer 302 serving as communication slaves.

[P2P Communication]

Next follows a description of the P2P communication performed among the camera 200 (camera microcomputer 205), the interchangeable lens 100 (lens microcomputer 111), and the adapter 300 (adapter microcomputer 302). The P2P communication is a one-to-one communication (individual communication) in which the camera 200 as the communication master designates (selects) a single communication counterpart (specific accessory apparatus) among the interchangeable lens 100 and the adapter 300 as the communication slaves, and communicates data with only the designated communication slave. This P2P communication is also performed using the signal line CS and the signal line DATA. A communication mode in which the P2P communication is performed will be also referred to as a P2P communication mode (second communication mode).

Figure 5:
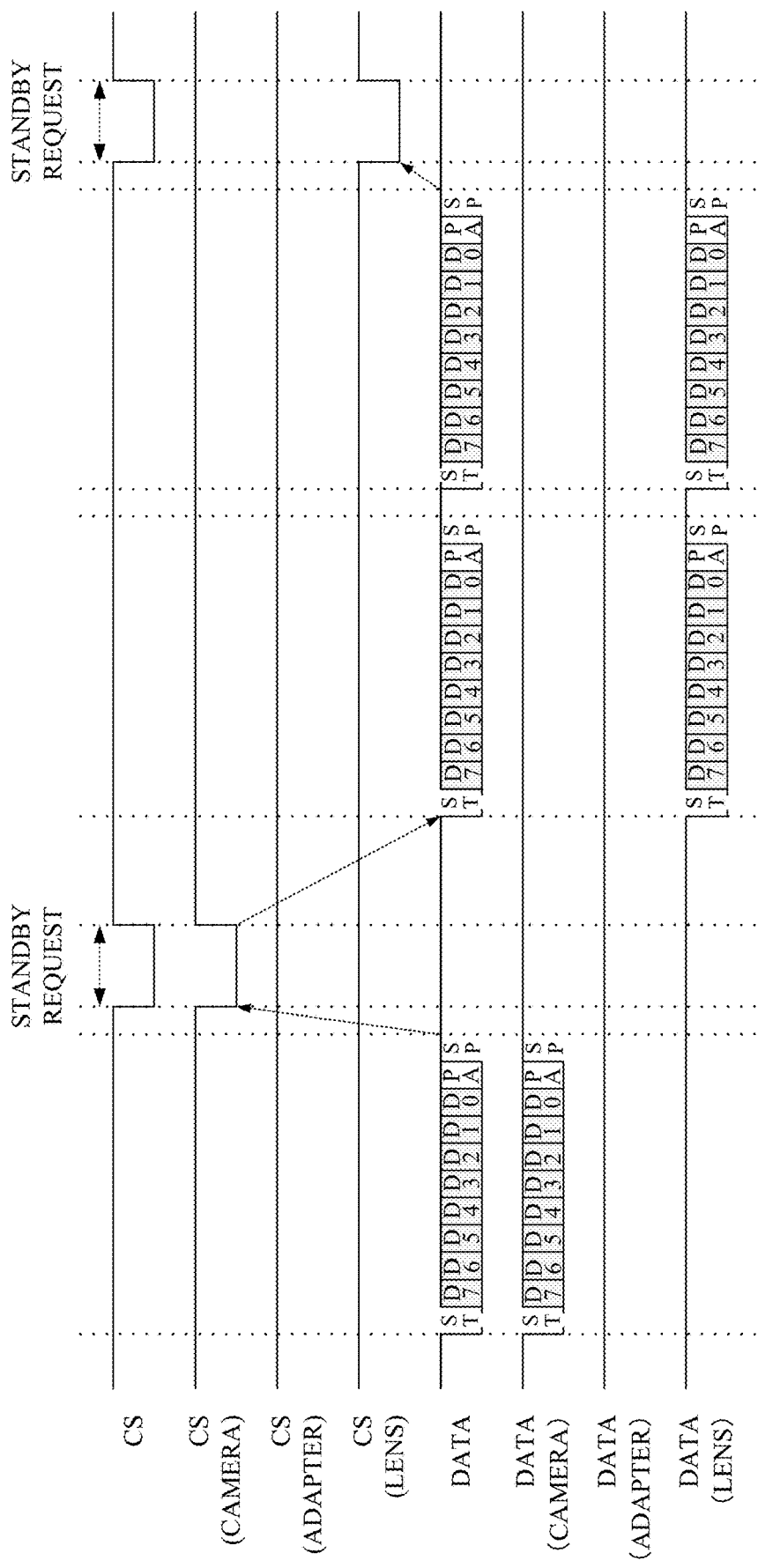
FIG. 5 is a diagram illustrating communication waveforms in a P2P communication according to the first embodiment.

FIG. 5 illustrates, in an example, signal waveforms of the P2P communication exchanged between the camera microcomputer 205 and the lens microcomputer (specific accessory apparatus) 111 designated as the communication counterpart. In response to one-byte data transmission from the camera microcomputer 205, the lens microcomputer 111 transmits two-byte data to the camera microcomputer 205. Communication mode switching processing (between the broadcast communication mode and the P2P communication mode) and processing for designating the communication counterpart in the P2P communication will be described later.

Initially, the camera microcomputer 205 as the communication master outputs data to be transmitted to the lens microcomputer 111, to the signal line DATA. The camera microcomputer 205 starts the low output (standby request) to the signal line CS after completing the output of the stop bit SP. After the camera microcomputer 205 is ready to receive the next data, the camera microcomputer 205 stops the low output to the signal line CS. On the other hand, after detecting the low signal input from the signal line CS, the lens microcomputer 111 analyzes the received data input from the signal line DATA and performs internal processing associated with the received data. Thereafter, when confirming that the signal level of the signal line CS has returned to the high level, the lens microcomputer 111 continuously outputs two-byte data to be transmitted, to the signal line DATA.

The lens microcomputer 111 starts the low output to the signal line CS after completing the output of the stop bit SP of the second byte. Thereafter, when becoming ready to receive the next data, the lens microcomputer 111 stops the low output to the signal line CS. The adapter microcomputer 302 that is not designated as the communication counterpart for the P2P communication does not output the signal to the signal line CS or the signal line DATA.

As described above, the signal transmitted through the signal line CS in the P2P communication serves as a notification signal indicating the end of the data transmission and a standby request for the next data transmission.

While FIG. 5 illustrates the illustrative P2P communication, another P2P communication may be used. For example, data may be transmitted every one byte at a time using the signal line DATA, or data may be transmitted every three bytes or more.

[Communication Mode Switching Processing and Communication Counterpart Designating Processing]

Figure 6:
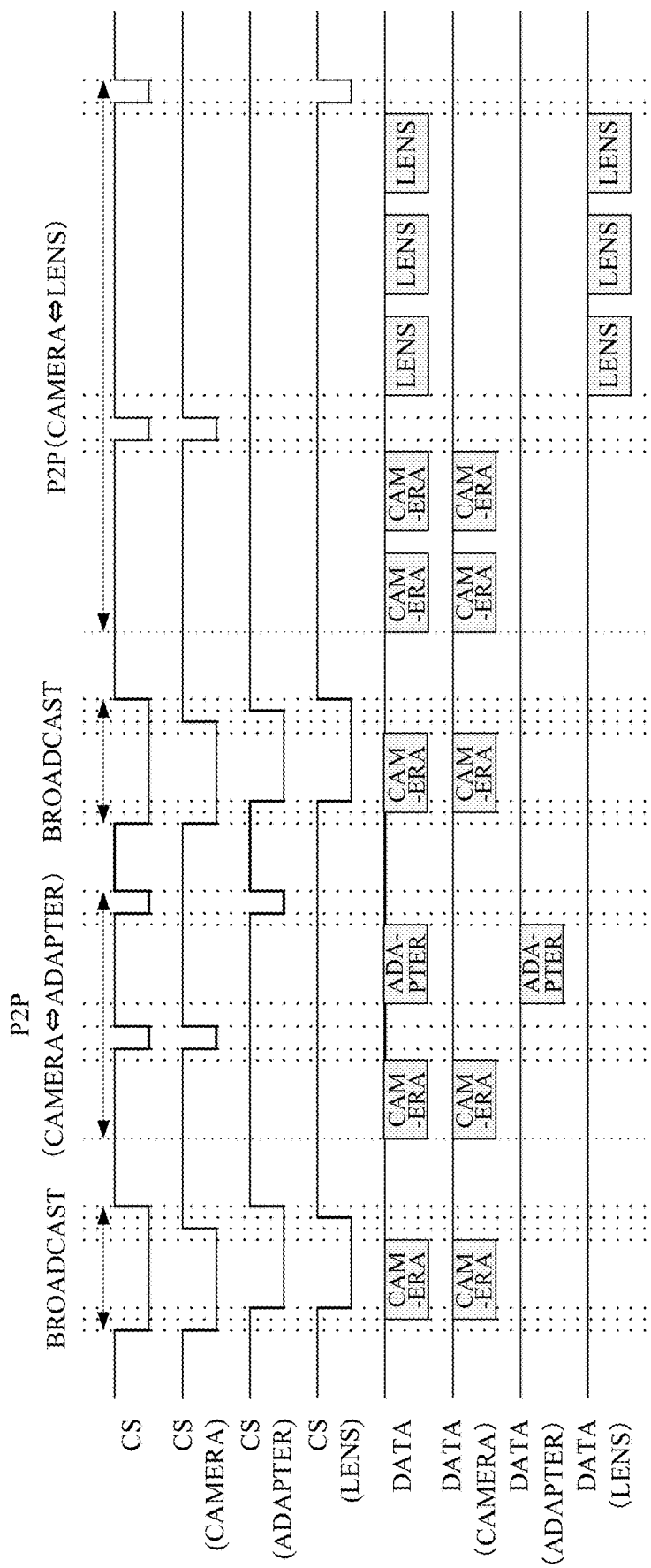
FIG. 6 is a diagram illustrating communication waveforms when the communication mode is switched in the first embodiment.

Referring now to FIG. 6, a description will be given of the communication mode switching processing and the communication counterpart designating processing in the P2P communication. FIG. 6 illustrates signal waveforms during the communication mode switching and communication counterpart designating, which are exchanged among the camera microcomputer 205, the lens microcomputer 111, and the adapter microcomputer 302. The communication counterpart of the P2P communication is designated by the broadcast communication. In this illustrative description, the adapter microcomputer 302 is designated as the communication counterpart of the P2P communication by the camera microcomputer 205, and one-byte data P2P communication from the camera microcomputer 205 and one-byte data P2P communication from the adapter microcomputer 302 are executed. Thereafter, the lens microcomputer 111 is designated as the communication counterpart of the P2P communication by the camera microcomputer 205, and two-byte data P2P communication from the camera microcomputer 205 and three-byte data P2P communication from the lens microcomputer 111 are executed.

Initially, the camera microcomputer 205 which is the communication master executes the broadcast communication according to the procedure described in FIG. 4. What is notified (data transmission) by this broadcast communication is slave designation data for designating the communication counterpart with the camera microcomputer 205 in the next P2P communication. The lens microcomputer 111 and the adapter microcomputer 302, which are the communication slaves at this time, determine whether or not they are designated as the communication counterpart in the P2P communication based on the slave designation data received by the broadcast communication. This determination result switches the communication modes of the camera microcomputer 205 and the designated communication slave (specific accessory apparatus) from the broadcast communication mode to the P2P communication mode. Since the adapter microcomputer 302 is designated herein as the communication counterpart in the next P2P communication, data is transmitted and received between the camera microcomputer 205 and the adapter microcomputer 302 in accordance with the procedure described in FIG. 5. Herein, one-byte data is transmitted from the camera microcomputer 205 to the adapter microcomputer 302, and then one-byte data is transmitted from the adapter microcomputer 302 to the camera microcomputer 205.

When the P2P communication ends between the camera microcomputer 205 and the adapter microcomputer 302, the camera microcomputer 205 can again designate a communication counterpart for the P2P communication by the broadcast communication. Herein, in order to designate the lens microcomputer 111 as the communication counterpart for the next P2P communication, the lens microcomputer 111 is set to the slave designation data, and the broadcast communication is executed according to the procedure described in FIG. 4. In response to this broadcast communication, the adapter microcomputer 302 ends the P2P communication, and at the same time, the communication modes of the camera microcomputer 205 and the lens microcomputer 111 are switched to the P2P communication mode. If no broadcast communication is executed at this stage, the P2P communication continues between the camera microcomputer 205 and the adapter microcomputer 302.

In the next P2P communication, data is transmitted and received between the camera microcomputer 205 and the lens microcomputer 111 in accordance with the procedure described in FIG. 5. Herein, the camera microcomputer 205 transmits two-byte data to the lens microcomputer 111, and then the lens microcomputer 111 transmits three-byte data to the camera microcomputer 205.

As described above, the broadcast communication can designate the communication counterpart for the P2P communication, and at the same time, and the broadcast communication and the P2P communication can be switched.

Referring now to FIGS. 1 to 10, a description will be given of corresponding communication rate information acquiring processing and communication rate setting processing performed among the camera 200 (camera microcomputer 205), the interchangeable lens 100 (lens microcomputer 111), and the adapter 300 (adapter microcomputer 302). In the communication rate setting processing, a communication rate (communication speed) is set (instructed) which is used for each of the broadcast communication and the P2P communication.

[Corresponding Communication Rate Information Acquiring Processing]

Figure 10:
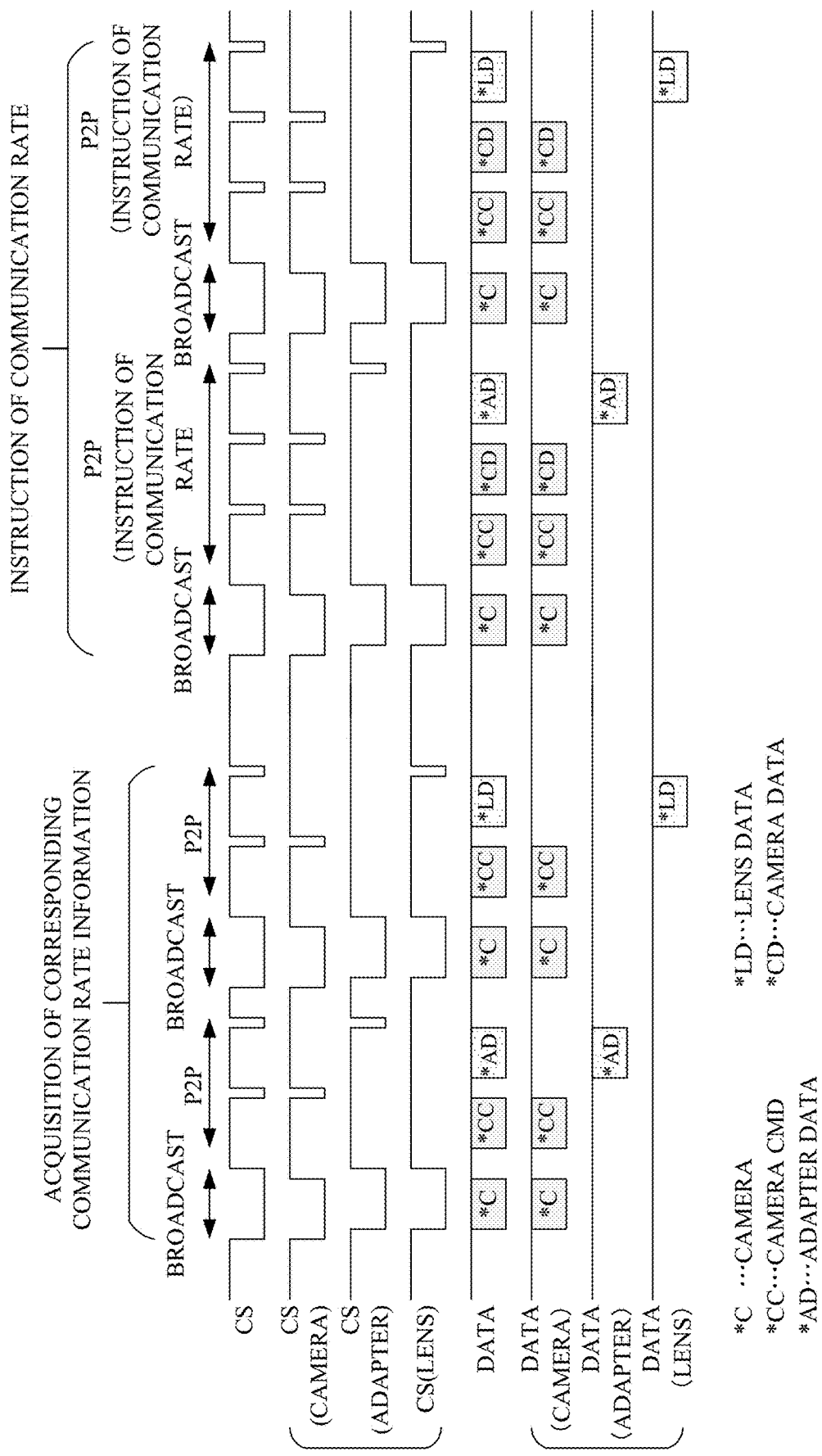
FIG. 10 is a diagram illustrating signal waveforms in acquiring corresponding communication rate information and a communication rate instruction according to the first embodiment.

A description will now be given of processing in which the camera microcomputer 205 that is the communication master acquires the corresponding communication rate information from the lens microcomputer 111 and the adapter microcomputer 302 that are the communication slaves. Left part in FIG. 10 illustrates a signal waveform when the camera microcomputer 205 acquires the corresponding communication rate information from the adapter microcomputer 302. In other words, the corresponding communication rate information is usable communication rate information, and is information indicating one or more of communication rates that is usable (supportable) by the communication slave.

Initially, the camera microcomputer 205, the lens microcomputer 111, and the adapter microcomputer 302 prepare for the initial communications by setting predetermined initial communication rates in the camera communication unit 208, the lens communication unit 112, and the adapter communication unit 303, respectively. The initial communication rate is determined in advance as the lowest communication rate among the communication rates commonly usable among the camera microcomputer 205, the lens microcomputer 111, and the adapter microcomputer 302.

Next, the camera microcomputer 205, which is the communication master, executes the broadcast communication according to the procedure described in FIG. 4, and designates the adapter microcomputer 302 as the communication counterpart of the next P2P communication. After the broadcast communication, the communication mode between the camera microcomputer 205 and the adapter microcomputer 302 is switched to the P2P communication mode, and the corresponding communication rate information 304 stored in the adapter microcomputer 302 is transmitted and received as illustrated in FIG. 1. The corresponding communication rate information 132, 210, and 304 stored in the lens microcomputer 111, the camera microcomputer 205, and the adapter microcomputer 302 will be described in detail in a second embodiment to be described later.

A description will now be given of transmission/reception processing of the corresponding communication rate information 304 of the adapter microcomputer 302 between the camera microcomputer 205 and the adapter microcomputer 302. In order to obtain the corresponding communication rate information from the adapter microcomputer 302 at the beginning of the P2P communication, the camera microcomputer 205 transmits one-byte data, which is the transmission request command for the corresponding communication rate information, to the adapter microcomputer 302. Next, the adapter microcomputer 302 that has received the transmission request command acquires the corresponding communication rate information 304 from the corresponding communication rate information storage unit and transmits it to the camera microcomputer 205. FIG. 10 illustrates one-byte data transmission, but when there are a plurality of pieces of corresponding communication rate information 304 stored in the corresponding communication rate information storage unit, multi-byte data is transmitted so as to transmit all corresponding communication rate information.

When the camera microcomputer 205 acquires the corresponding communication rate information 132 of the lens microcomputer 111, processing similar to that for acquiring the corresponding communication rate information 304 of the adapter microcomputer 302 is performed.

In order to obtain the corresponding communication rate information for performing the communication rate setting processing, it is necessary to obtain the corresponding communication rate information of all the communication slaves connected to the communication master. When two communication slaves (adapter microcomputer 302 and lens microcomputer 111) are connected to the communication master as in this embodiment, the corresponding communication rate information is acquired from each of these communication slaves.

[Communication Rate Setting Processing]

Based on the acquired communication rate information of all communication slaves, the camera microcomputer 205 sets a communication rate used for the broadcast communication (first communication rate) and a communication rate used for the P2P communication (second communication rate). This embodiment selects a communication rate RateB for the broadcast communication, a communication rate RateP1 between the camera microcomputer 205 and the adapter microcomputer 302 and a communication rate RateP2 between the camera microcomputer 205 and the lens microcomputer 111 in the P2P communication. A detailed description will be given of the communication rate selection processing according to the second embodiment to be described later. In the following description, a communication rate used for the broadcast communication will be referred to as a broadcast communication rate, and a communication rate used for the P2P communication will be referred to as a P2P communication rate.

Next, in order to instruct the broadcast microcomputer rate and the P2P communication rate selected by the communication rate selecting processing to the adapter microcomputer 302 and the lens microcomputer 111, the camera microcomputer 205 performs a communication rate instruction communication with them. In the communication rate instruction communication, similar to the communication performed in the processing for acquiring the corresponding communication rate information described above, the camera microcomputer 205 as the communication master first selects a communication slave that is a counterpart of the P2P communication by the broadcast communication.

Next, the camera microcomputer 205 instructs the broadcast communication rate and the P2P communication rate by the P2P communication. For example, when the camera microcomputer 205 designates the adapter microcomputer 302 as a communication counterpart of P2P communication in the procedure described in FIG. 4, the camera microcomputer 205 and the adapter microcomputer 302 switch the communication mode from the broadcast communication mode to the P2P communication mode. Next, at the beginning of the P2P communication, the camera microcomputer 205 transmits one-byte data that is the communication rate setting command to the adapter microcomputer 302. Receiving this command, the adapter microcomputer 302 recognizes that the command is a communication rate setting command and prepares to receive the communication rate setting data transmitted in the next communication frame.

Next, the camera microcomputer 205 transmits the communication rate setting data indicating the broadcast communication rate RateB to the adapter microcomputer 302. The camera microcomputer 205 also transmits the communication rate setting data indicating the P2P communication rate RateP1 between the camera microcomputer 205 and the adapter microcomputer 302. This embodiment illustrates the communication rate setting data as one-byte data, multi-byte data may be transmitted according to the amount of communication rate setting data to be transmitted.

The adapter microcomputer 302 that has received the communication rate setting command and the communication rate setting data performs predetermined determination processing in order to determine whether the communication data has been correctly transmitted. Then, communication response data as the determination result is transmitted to the camera microcomputer 205 in the next communication frame. The camera microcomputer 205 can determine whether the communication rate is correctly instructed and set according to the received communication response data. If the communication rate is set correctly, a series of communication rate setting processing is completed so far.

The camera microcomputer 205 sets the broadcast communication rate RateB with the lens microcomputer 111 and the P2P communication rate RateP1 in the same manner as the setting processing for the adapter microcomputer 302.

It is necessary to perform a communication for setting the communication rate to all communication slaves connected to the communication master. When two communication slaves (adapter microcomputer 302 and lens microcomputer 111) are connected to the communication master as in this embodiment, the communication rate is instructed and set for them.

[Communication Rate Switching Processing]

Figure 11:
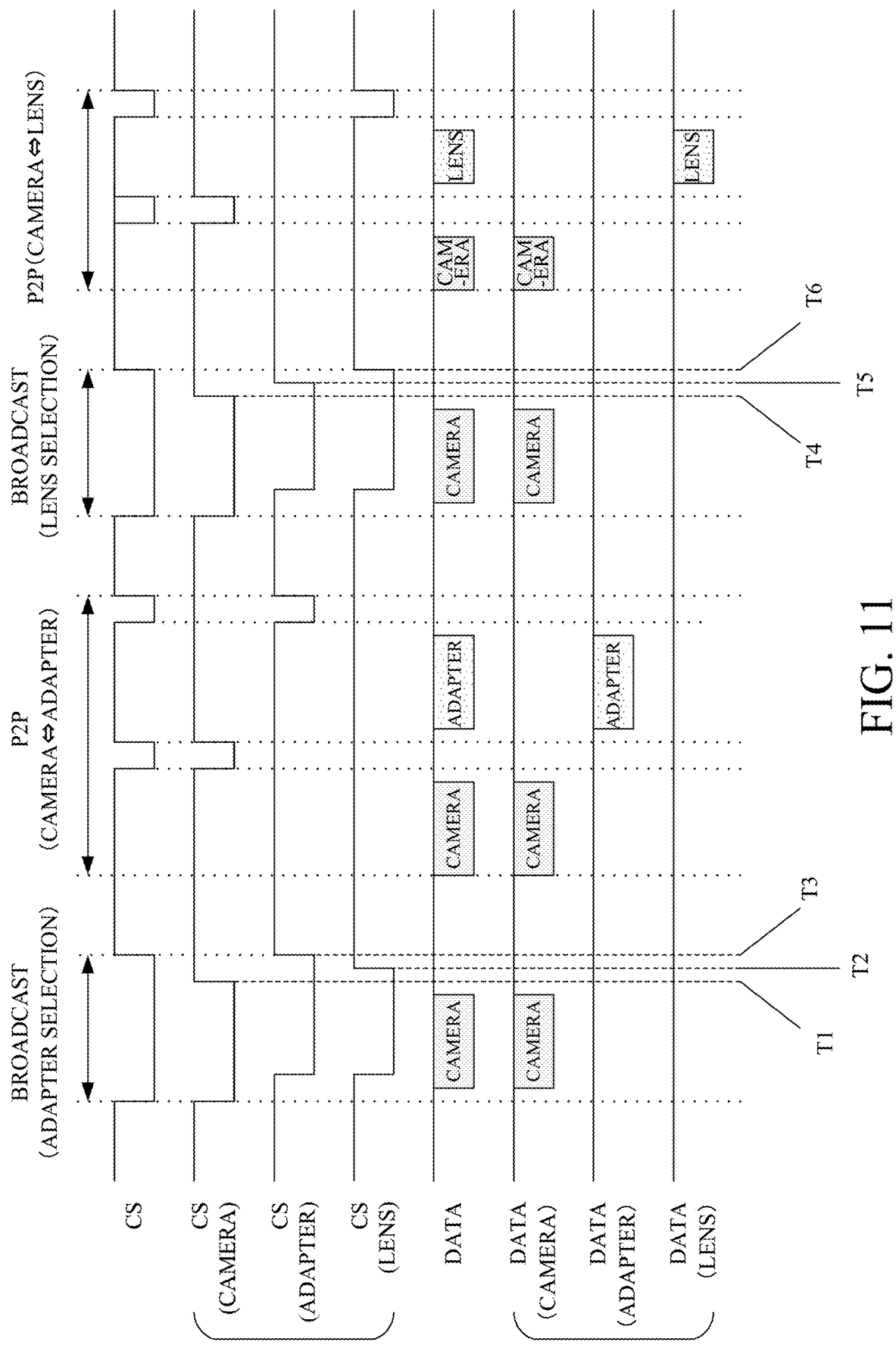
FIG. 11 is a diagram illustrating communication waveforms when the communication rate is changed according to the first embodiment.

Referring now to FIG. 11, a description will be given of switching processing from the broadcast communication rate RateB to the P2P communication rates RateP1 and RateP2 performed among the camera microcomputer 205, the lens microcomputer 111, and the adapter microcomputer 302.

In this embodiment, the communication rates RateB, RateP1 and RateP2 have the following relationship.

$$RateB \leq RateP1 < RateP2$$

In other words, the P2P communication rates (second communication rates) RateP1 and RateP2 are set to be equal to or higher than the broadcast communication rate RateB (first communication rate or higher), and the P2P communication rate RateP2 is a a communication rate higher than the P2P communication rate RateP1.

The camera microcomputer 205, the lens microcomputer 111, and the adapter microcomputer 302 initially determine the used communication mode as the broadcast communication. First, the camera microcomputer 205 as the communication master executes the broadcast communication according to the procedure described in FIG. 4. The communication rate used herein is the broadcast communication rate RateB determined in advance by the communication rate setting processing described above. The lens microcomputer 111 and the adapter microcomputer 302 as the communication slaves determine whether or not they are designated as the communication counterparts of the P2P communication based on slave designation data received by the broadcast communication. Then, the communication modes of the designated communication slave and the camera microcomputer 205 are switched to the P2P communication mode.

In FIG. 11, the camera microcomputer 205 transmits the slave designation data (data for notifying that it is a specific accessory) that designates the adapter microcomputer 302 as the communication counterpart of the P2P communication by the first broadcast communication. Next, the camera microcomputer 205 notifies the completion of data transmissions by the broadcast communication to all communication slaves by setting the signal line CS to High at timing T1. Further, the camera microcomputer 205 instructs switching from the broadcast communication to the P2P communication for the adapter microcomputer 302 designated as the communication counterpart of the P2P communication by outputting High (the same signal) to the signal line CS at the timing T1. In other words, it instructs the start (execution) of the P2P communication and switching from the broadcast communication rate to the P2P communication rate.

Among the communication slaves that have recognized the completion of data transmission, the communication slave that is designated as the communication counterpart of the P2P communication by the slave designation data (designation is notified) and the communication slave that is not a communication counterpart is notified (designation is not notified) receive different processing thereafter.

The lens microcomputer 111 that has not been notified of the designation as the communication counterpart notifies the camera microcomputer 205 as the communication master of the completion of the data reception processing by setting the signal line CS to High at timing T2 when the communication data reception processing by the broadcast communication is completed. Thereafter, the lens microcomputer 111 transfers to the communication standby state so as to maintain the broadcast communication rate, not to perform the reception processing of the communication data transmitted by the P2P communication between the camera microcomputer 205 and the adapter microcomputer 302, and to wait for the start of the next broadcast communication.

On the other hand, when the adapter microcomputer 302 notified of the designation as the communication counterpart detects High of the signal line CS at the timing T1 notified from the camera microcomputer 205, the adapter microcomputer 302 changes the communication rate from the broadcast communication rate RateB to the P2P communication rate RateP1. Further, the adapter microcomputer 302 prepares for the data communication by the P2P communication and notifies the camera microcomputer 205 of the completion of the transfer to the communication standby state of the P2P communication by setting the signal line CS to be high at timing T3.

The camera microcomputer 205 recognizes that the adapter microcomputer 302 designated as the communication counterpart of the P2P communication has completed the broadcast communication and further has completed preparing to receive the P2P communication by switching the signal line CS to High at the timing T3. Next, the camera microcomputer 205 changes the communication rate to the P2P communication rate RateP1 with the adapter microcomputer 302 that is the communication counterpart of the P2P communication, and executes P2P communication.

When the P2P communication rate RateP1 with the adapter microcomputer 302 is the same communication rate as the broadcast communication rate RateB, the communication rate switching processing described above may not be performed.

A description will now be given of a case where the camera microcomputer 205 designates the lens microcomputer 111 as the communication counterpart of the P2P communication. The camera microcomputer 205 designates the lens microcomputer 111 as the communication counterpart of the P2P communication in the second broadcast communication in FIG. 11. The camera microcomputer 205 instructs the lens microcomputer 111 designated as the communication counterpart of the P2P communication to switch from the broadcast communication to the P2P communication by setting the signal line CS to be High (the same signal) of at timing T4. In other words, it instructs the start (execution) of the P2P communication and switching from the broadcast communication rate to the P2P communication rate.

The adapter microcomputer 302 that has not been notified of the designation as the communication counterpart notifies the camera microcomputer 205 as the communication master that the communication data reception processing by the broadcast communication is completed, by setting the signal line CS to be High at timing T5. Thereafter, the adapter microcomputer 302 transfers to the communication standby state so as to maintain the broadcast communication rate, not to perform the reception processing of the communication data transmitted by the P2P communication between the camera microcomputer 205 and the lens microcomputer 111, and to wait for the start of the next broadcast communication.

On the other hand, when detecting High of the signal line CS at the timing T4, the lens microcomputer 111 changes the communication rate to the P2P communication rate RateP2. Further, the lens microcomputer 111 prepares to receive the data in the P2P communication, and notifies the camera microcomputer 205 of the completion of the transfer to the reception standby state of the P2P communication by setting the signal line CS to be high at timing T6.

The camera microcomputer 205 recognizes that the lens microcomputer 111 designated as the communication counterpart of the P2P communication has completed the broadcast communication and the preparation for the reception of the P2P communication has been completed because the signal line CS is switched to High at timing T6. Next, the camera microcomputer 205 changes the communication rate to the P2P communication rate RateP2 with the lens microcomputer 111 that is the communication counterpart of P2P communication, and executes the P2P communication.

Thus, in the example of FIG. 11, the P2P communication rate RateP2 between the camera microcomputer 205 and the lens microcomputer 111 is higher than the P2P communication rate RateP1 with the adapter microcomputer 302. Hence, in the P2P communication between the camera microcomputer 205 and the lens microcomputer 111, it is possible to communicate a large amount of data in a shorter time than the P2P communication with the adapter microcomputer 302.

As described above, this embodiment can properly change the communication rate used for the P2P communication with each communication slave in the camera system that performs a communication using the two lines (channels) of the signal line CS and the signal line DATA. It is thus unnecessary to decrease the communication rate of the entire camera system down to a low speed so as to match the communication slave having a low corresponding communication rate, and the high-speed communication can be performed that fully utilizes the communication performance of the communication slave that can use a high communication rate. In addition, by instructing switching of the communication mode and communication rate using the signal line CS, the switching processing can be performed at a high speed.

[Communication Control Processing]

Figure 7A:
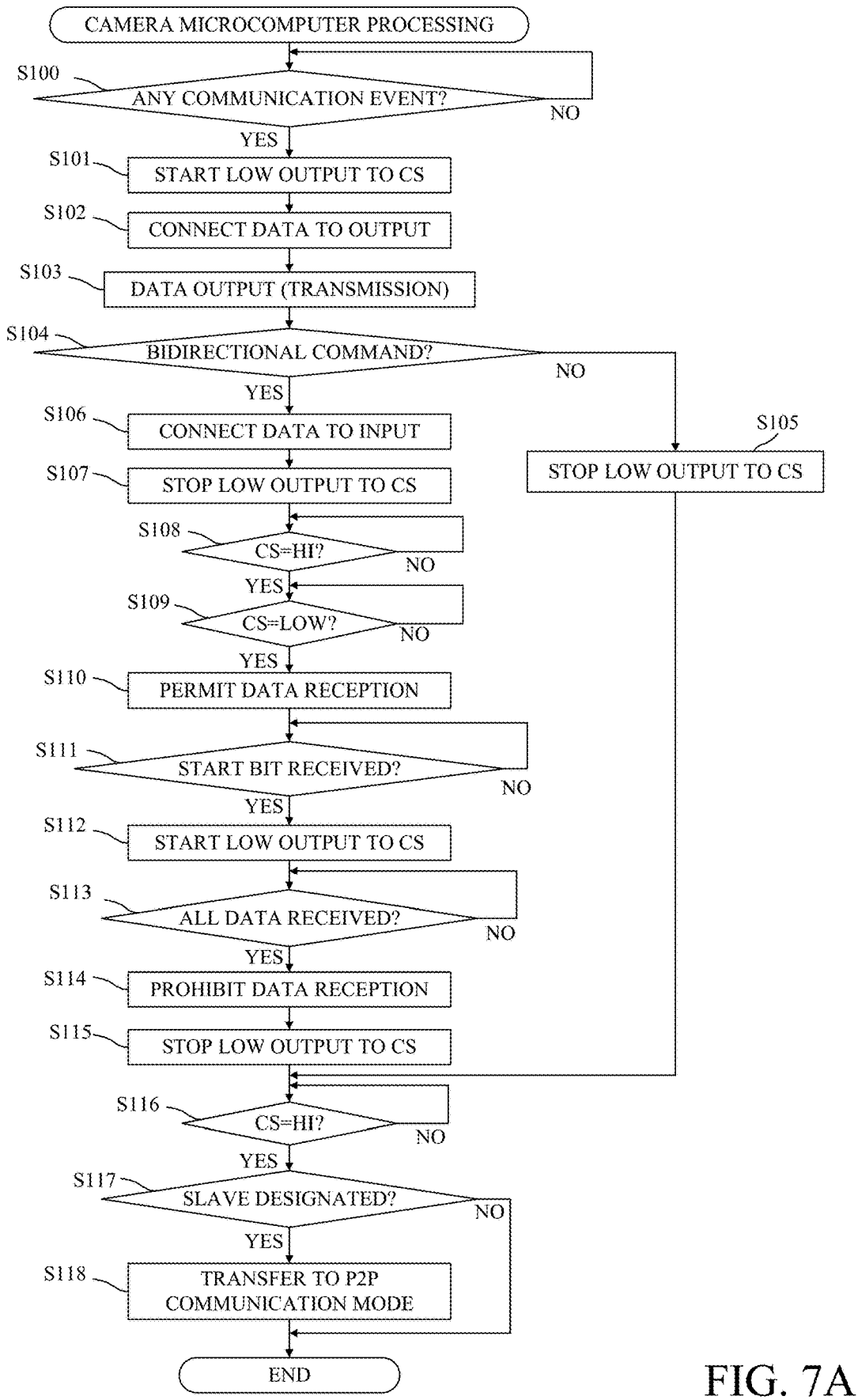
FIG. 7A is a flowchart illustrating processing of the camera in the broadcast communication according to the first embodiment.
Figure 7B:
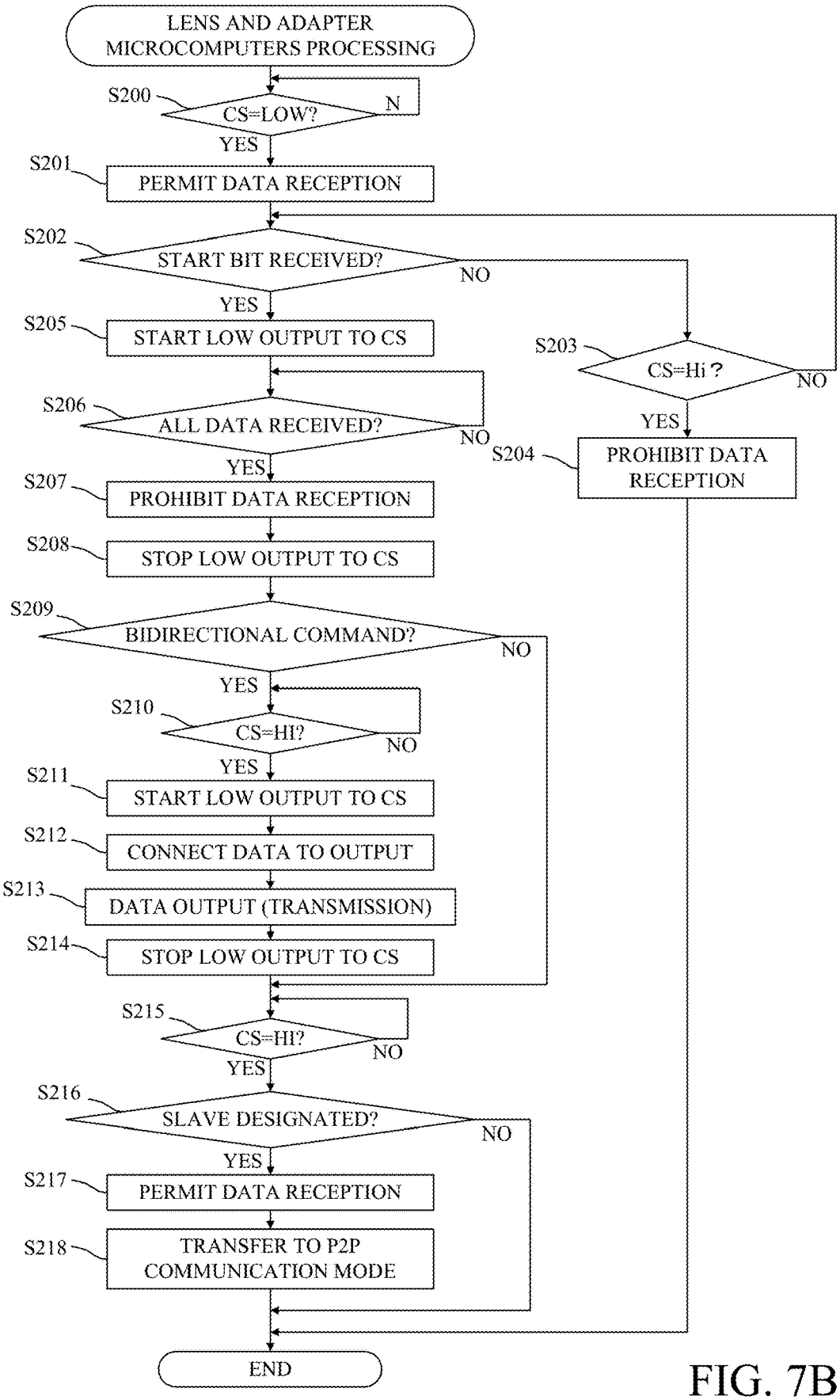
FIG. 7B is a flowchart illustrating processing of the interchangeable lens and the adapter in the broadcast communication according to the first embodiment.

A description will now be given of communication control processing performed among the camera microcomputer 205, the lens microcomputer 111, and the adapter microcomputer 302. Referring now to the flowchart in FIGS. 7A and 7B, a description will be given of processing in the broadcast communication mode. FIG. 7A illustrates processing performed by the camera microcomputer 205, and FIG. 7B illustrates processing performed by the lens microcomputer 111 and the adapter microcomputer 302. Each of the camera microcomputer 205, the lens microcomputer 111, and the adapter microcomputer 302, each of which includes the computer, executes this processing and other processing described later in accordance with a communication control program as a computer program.

When an event for starting the broadcast communication occurs in the step S100, the camera microcomputer 205 turns on (connects) the ground switch 2081 to put the signal line CS into low in the step S101. Thereby, the start of the broadcast communication is notified to the lens microcomputer 111 and the adapter microcomputer 302. The lens microcomputer 111 and the adapter microcomputer 302 that have detected the low level of the signal line CS in the step S200 permit the data reception from the signal line DATA in the step S201.

Next, the camera microcomputer 205 operates the input/output switch 2082 in the step S102 to connect the signal line DATA to the data output part, and performs the data transmission in the step S103. When detecting the start bit of the signal line DATA in the step S202, the lens microcomputer 111 and the adapter microcomputer 302 turns on (connects) the lens switch 1121 and the ground switch 3031 so as to indicate the ongoing communication processing in the step S205. Thereby, the low output to the signal line CS starts. Thereafter, when determining that all data has been received in the step S206, the lens microcomputer 111 and the adapter microcomputer 302 prohibit the data reception from the signal line DATA in the step S207. Further, in the step S208, the ground switch 1121 and the ground switch 3031 are turned off (disconnected) to indicate that the communication processing has ended, and the low output to the signal line CS is stopped. Herein, the number of bytes of data to be transmitted and received is not limited, as long as the camera microcomputer 205, the lens microcomputer 111, and the adapter microcomputer 302 has common recognitions.

Next, in the step S104, the camera microcomputer 205 determines whether the data transmitted in the step S103 is a bidirectional command including the transmission from the lens microcomputer 111 or the adapter microcomputer 302. If data is not the bidirectional command, the camera microcomputer 205 turns off (disconnects) the ground switch 2081 in the step S105 to stop the low output to the signal line CS, and proceeds to the step S116. If it is the bidirectional command, the camera microcomputer 205 operates the input/output switch 2082 in the step S106 to connect the signal line DATA to the data input part. In the step S107, the ground switch 2081 is turned off (disconnects) to stop the low output to the signal line CS, and it waits for the signal line CS to become high in the step S108.

On the other hand, in the step S209, the lens microcomputer 111 and the adapter microcomputer 302 determine whether the data received in the step S206 is the bidirectional command including the transmission from itself. If the data is not the bidirectional command, the lens microcomputer 111 and the adapter microcomputer 302 proceed to the step S215, and if the data is the bidirectional command, the lens microcomputer 111 and the adapter microcomputer 302 wait for the signal line CS to become high in the step S210. When the signal line CS becomes high, the lens microcomputer 111 and the adapter microcomputer 302 notify the start of the broadcast communication by turning on (connecting) the ground switches 1121 and 3031 and by putting the signal line CS into low in the step S211. When detecting the low level of the signal line CS in the step S109, the camera microcomputer 205 permits the data reception from the signal line DATA in the step S110.

Next, the lens microcomputer 111 and the adapter microcomputer 302 operate the input/output switches 1122 and 3032 in the step S212 to connect the signal line DATA to the data output part, and perform the data transmission in the step S213. When detecting the start bit of the signal line DATA in the step S111, the camera microcomputer 205 turns on (connects) the ground switch 2081 to indicate ongoing communication processing in the step S112. Thereby, the low output to the signal line CS starts. The lens microcomputer 111 and the adapter microcomputer 302 stop the low output to the signal line CS by turning off (shut off) the ground switches 1121 and 3031 in the step S214 after the transmissions of all data are completed. If the camera microcomputer 205 determines that all data has been received in the step S113, it prohibits the data reception from the signal line DATA in the step S114. In the step S115, the camera microcomputer 205 turns off (disconnects) the ground switch 2081 to stop the low output to the signal line CS in order to indicate that the communication processing has ended. Herein, the number of bytes of data to be transmitted and received is not limited, as long as the camera microcomputer 205, the lens microcomputer 111, and the adapter microcomputer 302 have common recognitions.

Next, the camera microcomputer 205 waits for the signal line CS to become high in the step S116. When the signal line CS becomes high, the camera microcomputer 205 determines in the step S117 whether or not the lens microcomputer 111 or the adapter microcomputer 302 has been designated as a communication counterpart for the P2P communication based on the data transmitted in the step S103. If none of the lens microcomputer 111 and the adapter microcomputer 302 are designated as the communication counterparts, the camera microcomputer 205 ends the processing as it is, and if any is designated, the camera microcomputer 205 transfers to the P2P communication mode in the step S118.

On the other hand, the lens microcomputer 111 and the adapter microcomputer 302 stand by until the signal line CS becomes high in the step S215. When the signal line CS becomes high, in the step S216, the lens microcomputer 111 and the adapter microcomputer 302 determine whether or not they are designated as the communication counterpart for the P2P communication by the camera microcomputer 205, based on the data received in the step S206. If none of the lens microcomputer 111 and the adapter microcomputer 302 are designated as the communication counterparts, the processing ends. If it is designated as the communication counterpart, the designated microcomputer out of the lens microcomputer 111 and the adapter microcomputer 302 permits the data reception from the signal line DATA in the step S217, and transfers to the P2P communication mode in the step S218.

If the start bit is not detected in the step S202, the lens microcomputer 111 and the adapter microcomputer 302 confirm whether or not the signal line CS has become high in the step S203. When the signal line CS becomes high (returns to the high level), the lens microcomputer 111 and the adapter microcomputer 302 prohibit the data reception from the signal line DATA in the step S204 and end the processing. This is processing for a communication slave not designated as a communication counterpart for the P2P communication to respond to the low output to the signal line CS by the P2P communication between the camera microcomputer 205 and another communication slave.

Figure 8A:
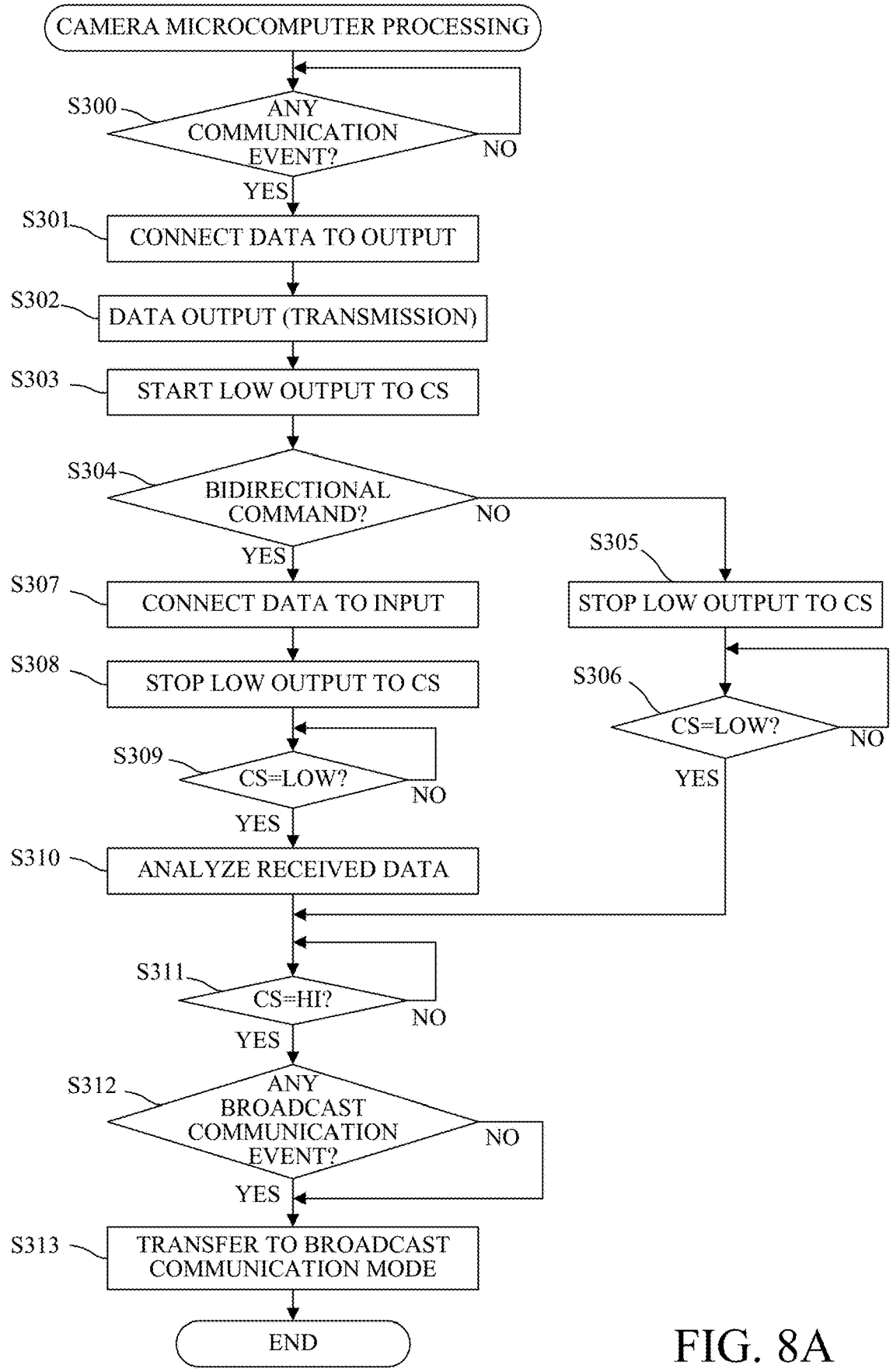
FIG. 8A is a flowchart illustrating processing of the camera in the P2P communication according to the first embodiment.
Figure 8B:
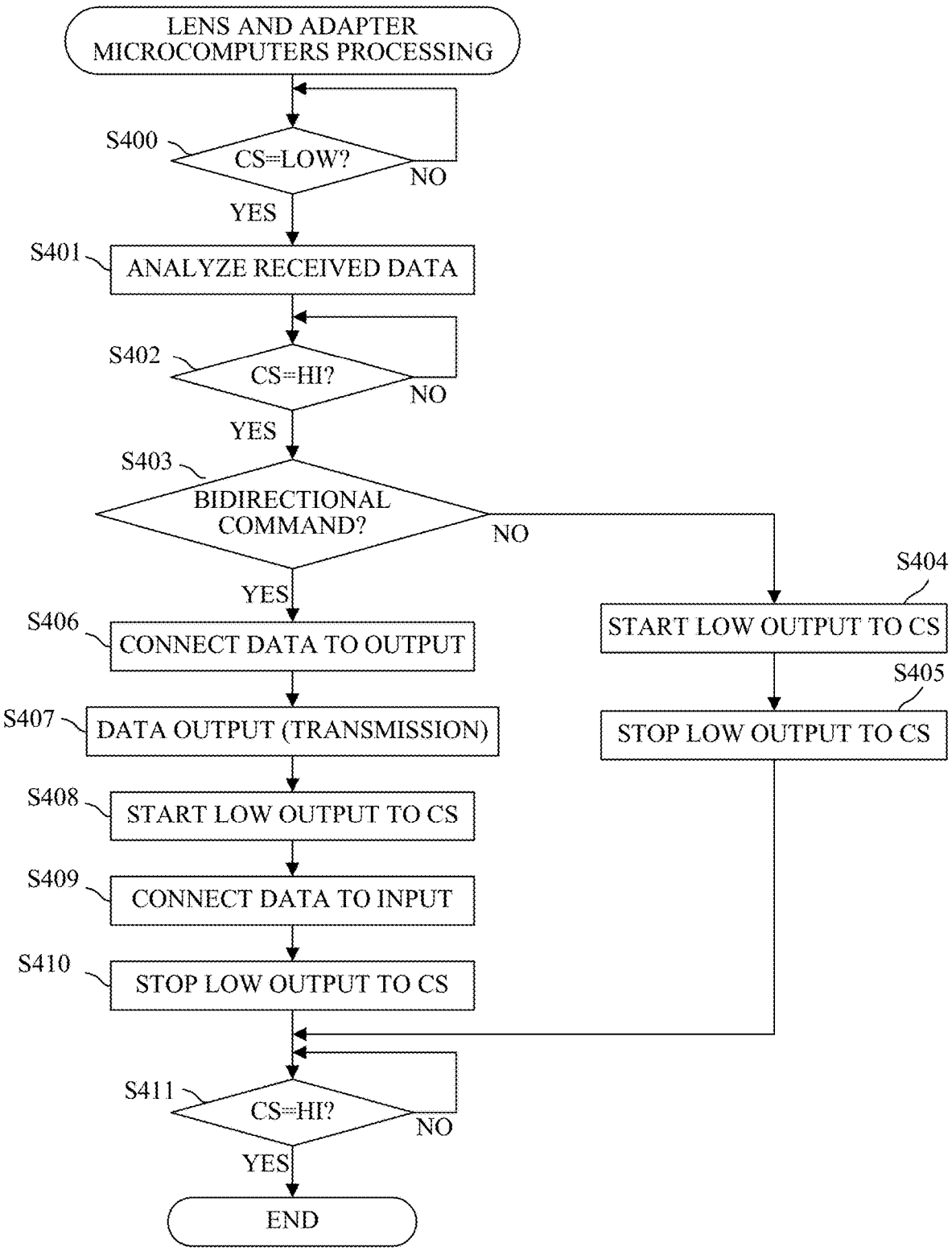
FIG. 8B is a flowchart illustrating processing of the interchangeable lens and the adapter in the P2P communication according to the first embodiment.

Referring now to flowcharts in FIGS. 8A and 8B, a description will be given of processing in the P2P communication mode. FIG. 8A illustrates processing performed by the camera microcomputer 205, and FIG. 8B illustrates processing performed by a microcomputer (referred to as a specific microcomputer hereinafter) designated as a communication counterpart for the P2P communication among the lens microcomputer 111 and the adapter microcomputer 302.

When an event for starting the P2P communication occurs in the step S300, the camera microcomputer 205 operates the input/output switch 2082 in the step S301 to connect the signal line DATA to the data output part, and performs the data transmission in the step S302. Thereafter, when all data transmissions are completed, the camera microcomputer 205 turns on (connects) the ground switch 2081 in the step S303 and starts the low output to the signal line CS. On the other hand, when the specific microcomputer detects the low level of the signal line CS in the step S400, it determines that the data transmission from the camera microcomputer 205 is completed, and analyzes the data received from the signal line DATA in the step S401.

Next, in the step S304, the camera microcomputer 205 determines whether the data transmitted in the step S302 is the bidirectional command including the transmission from the specific microcomputer. If it is not the bidirectional command, the camera microcomputer 205 turns off (disconnects) the ground switch 2081 in the step S305 to stop the low output to the signal line CS. In the step S306, it waits for the signal line CS to become high before proceeding to the step S311. If the data is the bidirectional command, the camera microcomputer 205 operates the input/output switch 2082 in the step S307 to connect the signal line DATA to the data input part. In the step S308, the ground switch 2081 is turned off (disconnected) to stop the low output to the signal line CS.

On the other hand, after waiting for the low level of the signal line CS in the step S402, the specific microcomputer determines in the step S403 whether the data received in the step S401 is the bidirectional command including the transmission from itself. If it is not the bidirectional command, the specific microcomputer turns on (connects) and turns off (disconnects) the ground switch (1121 or 3031) in the steps S404 and S405. Thereby, the low output to the signal line CS is started and stopped, and the flow proceeds to the step S411. In the bidirectional command, the specific microcomputer operates the input/output switch (1122 or 3032) in the step S406 to connect the signal line DATA to the data output part, and performs the data transmission in the step S407. Thereafter, when all data transmissions are completed, the specific microcomputer starts the low output to the signal line CS by turning on (connecting) the ground switch (1121 or 3031) in the step S408.

Next, when detecting the low level in the signal line CS in the step S609, the camera microcomputer 205 determines in the step S310 that the data transmission from the specific microcomputer has been completed, and analyzes the data received from the signal line DATA. On the other hand, in the step S409, the specific microcomputer operates the input/output switch (1122 or 3032) to connect the signal line DATA to the data input part. Thereafter, the specific microcomputer turns off (disconnects) the ground switch (1121 or 3031) in the step S410 to stop the low output to the signal line CS.

Next, the camera microcomputer 205 waits for the signal line CS to become high in the step S311. Thereafter, when an event for starting the broadcast communication occurs in the step S312, the camera microcomputer 205 transfers to the broadcast communication mode in the step S313. On the other hand, the specific microcomputer waits for the signal line CS to become high in the step S411 and ends the processing.

Thus, this embodiment properly switches the meaning (function) of the signal transmitted through the signal line CS between the broadcast communication and the P2P communication. Thereby, the camera microcomputer 205, the lens microcomputer 111, and the adapter microcomputer 302 can communicate with one another with the small number of signal lines (or channels).

Next follows a description of communication processing when the broadcast communication performed among the camera microcomputer 205, the lens microcomputer 111, and the adapter microcomputer 302 is started from the lens microcomputer 111 and the adapter microcomputer 302 that are communication slaves. A communication slave that starts the broadcast communication notifies the camera microcomputer 205 of a communication request.

Figure 9:
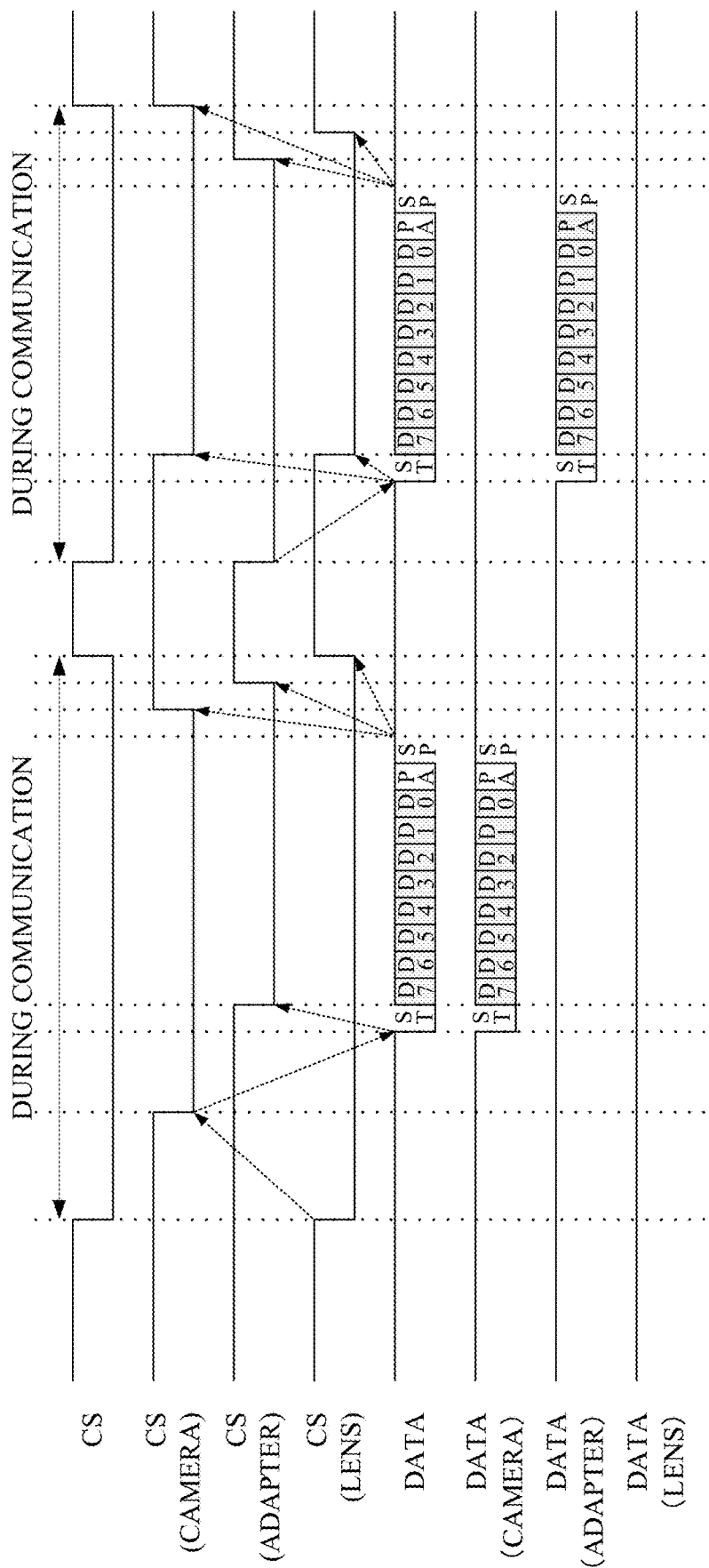
FIG. 9 is a diagram illustrating communication waveforms in the broadcast communication started from an interchangeable lens and an adapter in the first embodiment.

FIG. 9 illustrates signal waveforms in the broadcast communication. FIG. 9 illustrates the lens microcomputer 111 illustratively notifying the camera microcomputer 205 of the communication request and the camera microcomputer 205 starts the broadcast communication. The broadcast communication is performed from the adapter microcomputer 302 to the camera microcomputer 205 and the lens microcomputer 111 in response to the broadcast communication from the camera microcomputer 205 to the lens microcomputer 111 and the adapter microcomputer 302.

First, the lens microcomputer 111 starts a low output to the signal line CS in order to notify the camera microcomputer 205 and the adapter microcomputer 302 of a communication request for starting the broadcast communication. Next, when detecting that the signal level of the signal line CS has becomes low, the camera microcomputer 205 starts the low output to the signal line CS. At this time, since the lens microcomputer 111 has already started the low output to the signal line CS, the signal level of the signal line CS does not change.

Next, the camera microcomputer 205 outputs data to be transmitted, to the signal line DATA. On the other hand, the adapter microcomputer 302 starts the low output to the signal line CS at the timing when the start bit ST input from the signal line DATA is detected. At this time, since the camera microcomputer 205 has already started the low output to the signal line CS, the signal level of the signal line CS does not change.

Next, the camera microcomputer 205 stops the low output to the signal line CS after completing the output of the stop bit SP. On the other hand, after receiving up to the stop bit SP input from the signal line DATA, the lens microcomputer 111 and the adapter microcomputer 302 analyze the received data and perform internal processing associated with the received data, and stops the low output to the signal line CS after completing the preparation for receiving the next data. As described above, the signal level of the signal line CS becomes high when all of the camera microcomputer 205, the lens microcomputer 111, and the adapter microcomputer 302 cancel the low output to the signal line CS. Hence, the camera microcomputer 205, the lens microcomputer 111, and the adapter microcomputer 302 confirm that the signal level of the signal line CS becomes high after each canceling the low output to the signal line CS. It can be determined that the processing relating to the current communication is completed and the preparation for the next communication is completed.

Next, when confirming that the signal level of the signal line CS has returned to the high level, the adapter microcomputer 302 starts the low output to the signal line CS so as to notify the camera microcomputer 205 and the lens microcomputer 111 of the communication request for starting the broadcast communication. Next, the adapter microcomputer 302 outputs data to be transmitted, to the signal line DATA. On the other hand, the camera microcomputer 205 and the lens microcomputer 111 start the low output to the signal line CS at the timing when the start bit ST input from the signal line DATA is detected. At this time, since the adapter microcomputer 302 has already started the low output to the signal line CS, the signal level of the signal line CS does not change.

Next, after completing the output of the stop bit SP, the adapter microcomputer 302 cancels the low output to the signal line CS. On the other hand, after receiving up to the stop bit SP input from the signal line DATA, the camera microcomputer 205 and the lens microcomputer 111 analyze the received data and perform the internal processing associated with the received data, and release the low output to the signal line CS after completing preparing for receiving the next data.

Thus, the lens and adapter microcomputers 111 and 302 that are the communication slaves output the communication request for the broadcast communication only when all of the camera, lens, and adapter microcomputers 205, 111, and 302 are in the broadcast communication mode.

When the lens and adapter microcomputers 111 and 302 as the communication slaves output the communication request for the broadcast communication, the camera microcomputer 205 as the communication master cannot determine which communication slave has sends the low output to the signal line CS at this time. Thus, the camera microcomputer 205 needs to perform the communication for confirming whether the communication request for the broadcast communication has been output to both the lens microcomputer 111 and the adapter microcomputer 302.

In addition, at the timing when the camera microcomputer 205 sends the low output to the signal line CS to start the broadcast communication, the lens microcomputer 111 or the adapter microcomputer 302 may sends the low output to the signal line CS for the communication request. In this case, the camera microcomputer 205 cannot detect that the lens microcomputer 111 or the adapter microcomputer 302 has sent the low output to the signal line CS. Hence, the camera microcomputer 205 may notify the lens and adapter microcomputers 111 and 302 of the permission notification for permitting them to output the communication request for starting the broadcast communication.

As described above, this embodiment can start, from the communication slave, the broadcast communication for simultaneously transmitting data from the camera microcomputer 205 as the communication master to the lens microcomputer 111 and the adapter microcomputer 302 as the communication slaves. Thereby, the camera microcomputer 205 does not have to always communicate with the lens microcomputer 111 and the adapter microcomputer 302, restraining an unnecessary communication and reducing a communication amount.

Second Embodiment

Referring now to FIGS. 12 to 16, a description will be given of processing for setting the information format of the corresponding communication rate information, the broadcast communication rate RateB, and the P2P communication rates RateP1 and RateP2.

FIG. 12 illustrates the information format of the corresponding communication rate information stored in the camera microcomputer 205, the adapter microcomputer 302, and the lens microcomputer 111. In each corresponding communication rate information, 500 Kbps (bit per second) is registered as an initial communication rate that is a communication rate for the initial communication with which the camera microcomputer 205, the adapter microcomputer 302, and the lens microcomputer 111 can communicate with each other. As described above, the initial communication rate is the lowest communication rate usable for the camera microcomputer 205, the adapter microcomputer 302, and the lens microcomputer 111. In the corresponding communication rate information, a plurality of communication rates (such as 1 Mbps, 2 Mbps, 5 Mbps, and 10 Mbps) usable for each microcomputer can be registered as communication rates that are higher than the initial communication rate. The upper limit number of registrations is not limited, and the number of registrations may be different for each microcomputer.

[Communication Rate Selecting Processing]

Figure 15:
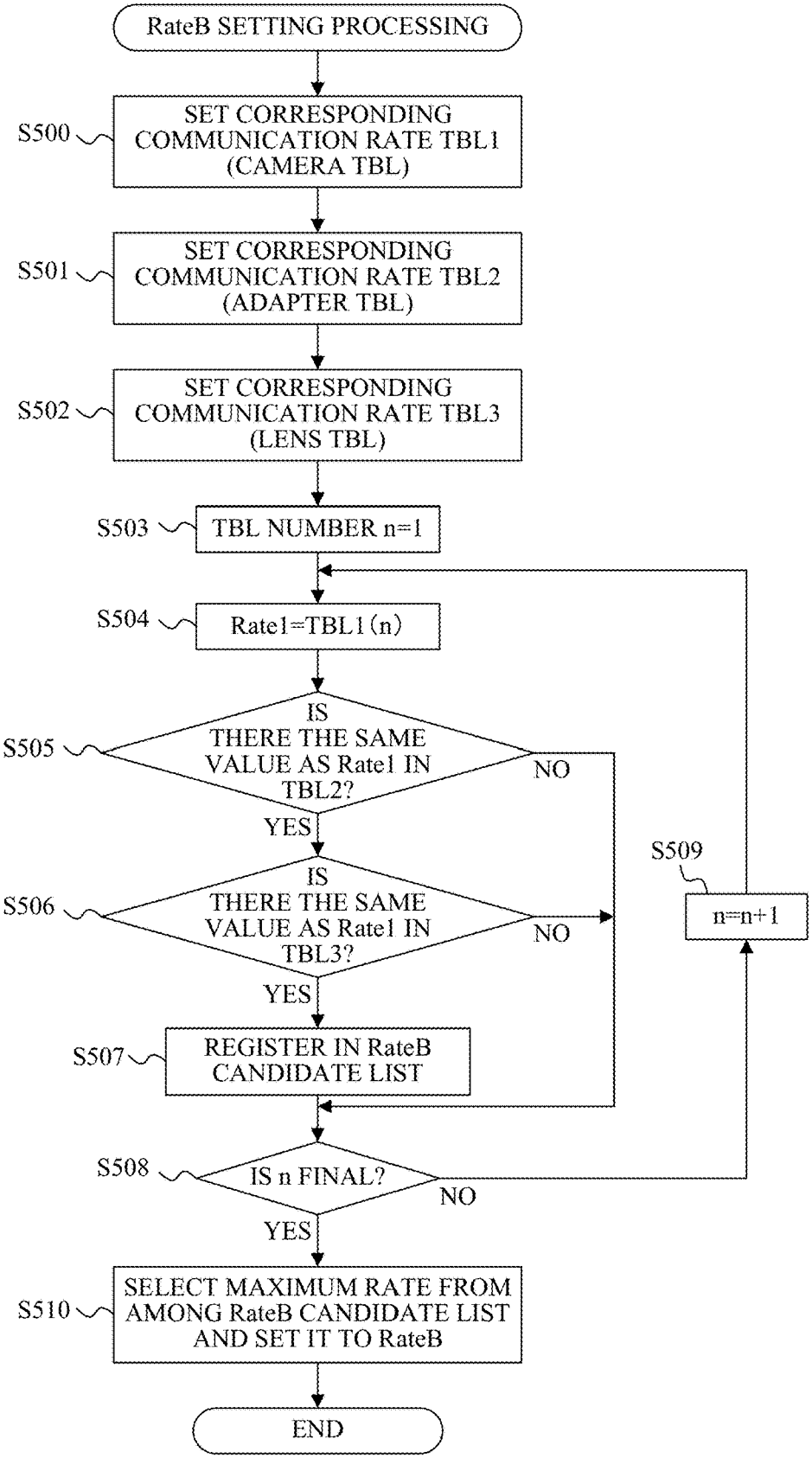
FIG. 15 is a flowchart illustrating broadcast communication rate selecting processing according to the first embodiment.
Figure 16:
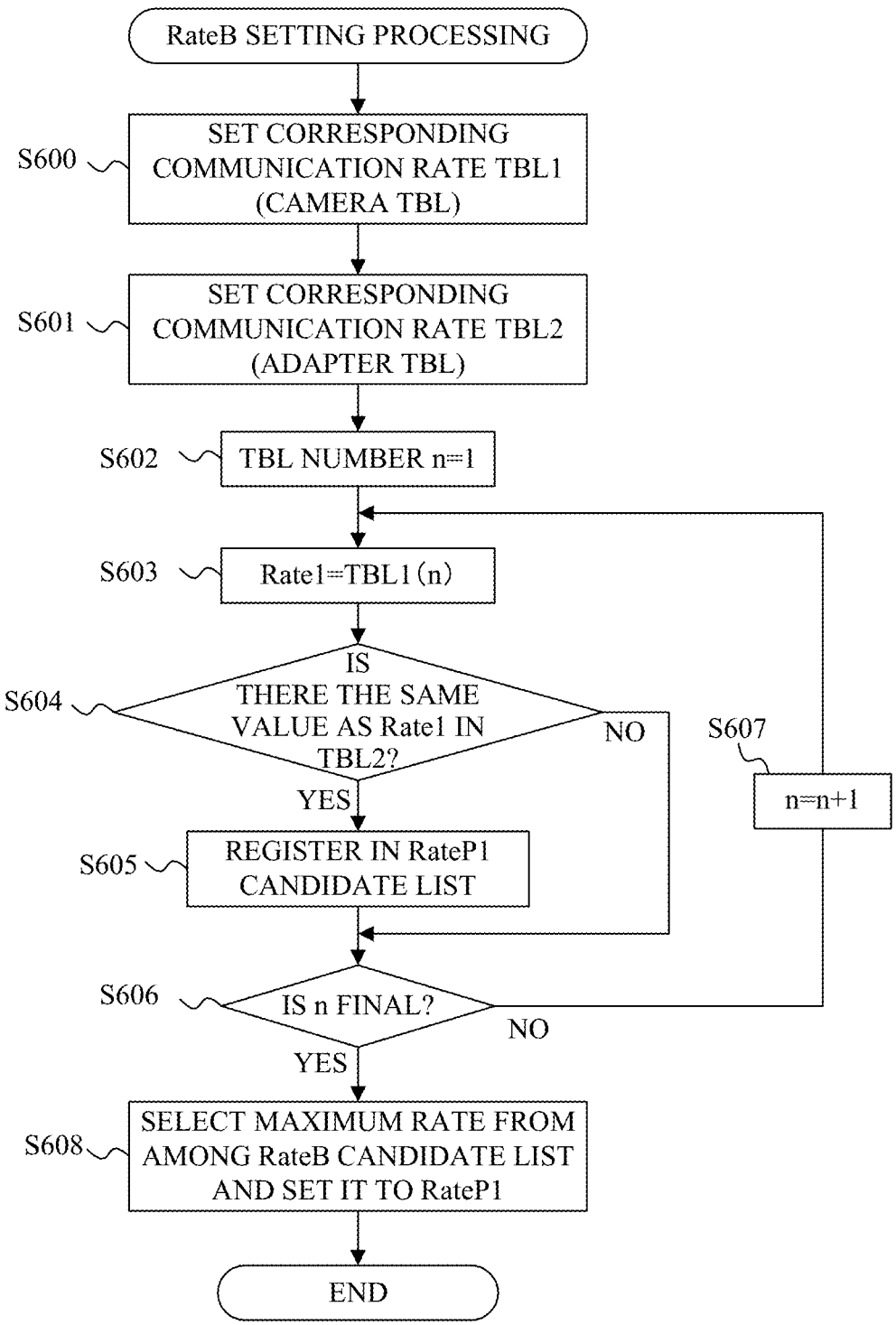
FIG. 16 is a flowchart illustrating P2P communication rate selecting processing according to the first embodiment.

Referring now to FIGS. 15 and 16, a description will be given of processing for selecting the broadcast communication rate RateB and the P2P communication rates RateP1 and RateP2. Now assume that the camera microcomputer 205 has already acquired the corresponding communication rate information 304 of the adapter microcomputer 302 and the corresponding communication rate information 132 of the lens microcomputer 111 by the corresponding communication rate information acquiring processing described in the first embodiment.

FIG. 15 illustrates processing for selecting the broadcast communication rate RateB. First, in the step S500, the camera microcomputer 205 sets its corresponding communication rate information 210 to a retrieval table TBL1. Next, in the step S501, the camera microcomputer 205 sets the corresponding communication rate information 304 of the adapter microcomputer 302 to a retrieval table TBL2. Furthermore, the camera microcomputer 205 sets the corresponding communication rate information 132 of the lens microcomputer 111 to a retrieval table TBL3 in the step S502. The preparation for the table retrieval processing is completed by the processing up to here.

Next, in the step S503, the camera microcomputer 205 registers a head number of the corresponding communication rate information 210 of its own in a table reference number n. In the step S504, the communication rate (1 Mbps) stored in the table number n=1 of the corresponding communication rate information 210 of its own is acquired and registered in Rate1. Next, the camera microcomputer 205 determines whether or not the same communication rate as 1 Mbps acquired in the step S504 is registered in the corresponding communication rate information 304 of the adapter microcomputer 302 in the step S505. If the same communication rate is registered, the camera microcomputer 205 determines whether or not the same communication rate as that acquired in the step S504 is registered in the corresponding communication rate information 132 of the lens microcomputer 111 in the step S506. If the same communication rate is registered or if there is a communication rate common to all the retrieval tables TBL1 to TBL3, the camera microcomputer 205 registers the common communication rate in a broadcast communication rate RateB candidate list in the step S507. On the other hand, when the same communication rate is not registered in any one of the retrieval tables TBL1 to TBL3, the registration in the candidate list is not performed.

Next, in the step S508, the camera microcomputer 205 determines whether or not the current confirmation table number is the final table number in the corresponding communication rate information 210 of its own. If it is not the final table number, the camera microcomputer 205 increments the table reference number n by 1 in order to obtain the communication rate stored in the next table number in the step S509. Then, the camera microcomputer 205 returns to the step S504 and repeats the above processing. Thus, the camera microcomputer 205 determines whether or not there is the common communication rate registered in the corresponding communication rate information 304 and 132 in the adapter microcomputer 302 and the lens microcomputer 111 regarding the communication rates subsequent to the table number n=2 of the corresponding communication rate information 210 of its own.

When the retrieval up to the final table number is completed, the camera microcomputer 205 confirms the common communication rate registered in the broadcast communication rate RateB candidate list in the step S510. In the corresponding communication rate information illustrated in FIG. 12, only 1 Mbps is a common communication rate. The camera microcomputer 205 selects this common communication rate as the broadcast communication rate RateB. When there are a plurality of common communication rates, the camera microcomputer 205 selects the highest common communication rate among them. Thereby, the communication time can be made as short as possible.

If the common communication rate is not registered in the candidate list of the communication rate RateB in the step S510, the camera microcomputer 205 selects the same communication rate as the initial communication rate for the broadcast communication rate RateB.

Through the processing described above, one or the highest common communication rate commonly registered in the corresponding communication rate information stored in the camera microcomputer 205, the adapter microcomputer 302, and the lens microcomputer 111 is selected (set) as the broadcast communication rate RateB.

FIG. 16 illustrates processing of selecting the P2P communication rate RateP1 between the camera microcomputer 205 and the adapter microcomputer 302. First, in the step S600, the camera microcomputer 205 sets the corresponding communication rate information 210 of its own to the retrieval table TBL1. Next, in the step S601, the camera microcomputer 205 sets the corresponding communication rate information 304 of the adapter microcomputer 302 to the retrieval table TBL2. The preparation for the table retrieval processing is completed by the processing up to here.

Next, the camera microcomputer 205 registers the head number of the corresponding communication rate information 210 of the camera microcomputer 205 in the table reference number n in the step S602. In the step S603, the camera microcomputer 205 acquires the communication rate (1 Mbps) stored in the table number n=1 of the corresponding communication rate information 210 of its own and registers it in Rate1. Next, in the step S604, the camera microcomputer 205 determines whether or not the same communication rate as 1 Mbps acquired in the step S603 is registered in the corresponding communication rate information 304 of the adapter microcomputer 302. If the same communication rate is registered or if there is a common communication rate in the retrieval tables TBL1 and TBL2, the camera microcomputer 205 adds the common communication rate to the candidate list for the P2P communication rate RateP1 in the step S605. On the other hand, if the same communication rate is not registered, the camera microcomputer 205 registers no information in the candidate list.

Next, in the step S606, the camera microcomputer 205 determines whether or not the current confirmation table number is the final table number in the corresponding communication rate information 210 of its own. If it is not the final table number, the camera microcomputer 205 increments the table reference number n by 1 in order to obtain the communication rate stored in the next table number in the step S607. Then, the camera microcomputer 205 returns to the step S603 and repeats the processing described above. Thus, the camera microcomputer 205 retrieves the common communication rate registered in common in the corresponding communication rate information 304 in the adapter microcomputer 302 for the communication rate subsequent to the table number n=2 of the corresponding communication rate information 210 of its own.

When the retrieval up to the final table number is completed by the processing up to here, the camera microcomputer 205 proceeds to the step S608 and confirms the communication rate registered in the P2P communication rate RateP1candidate list. In the corresponding communication rate information illustrated in FIG. 12, 1 Mbps and 2 Mbps are common communication rates, and the camera microcomputer 205 selects 2 Mbps, which is the highest communication rate among these two common communication rates, as the P2P communication rate RateP1.

On the other hand, if the common communication rate is not registered in the candidate list of the communication rate RateP1 in the step S608, the camera microcomputer 205 selects the same communication rate as the initial communication rate for the P2P communication rate RateP1.

Through the processing described above, one or the highest common communication rate commonly registered in the corresponding communication rate information stored in the camera microcomputer 205 and the adapter microcomputer 302 is selected (set) as the P2P communication rate RateP1.

The P2P communication rate RateP2 between the camera microcomputer 205 and the lens microcomputer 111 is similarly selected by the same selection processing as the selection processing of the P2P communication rate RateP1. In the example illustrated in FIG. 12, the common communication rates of 1 Mbps, 5 Mbps, 10 Mbps, and 20 Mbps are registered in the candidate list of the P2P communication rate RateP2, as illustrated in FIG. 13. The camera microcomputer 205 selects 20 Mbps, which is the fastest common communication rate among these common communication rates, as the P2P communication rate RateP2.

As described above, the camera microcomputer 205 acquires the corresponding communication rate information from the adapter microcomputer 302 and the lens microcomputer 111 using the predetermined initial communication rate. Based on the corresponding communication rate information, the highest communication rate among the communication rates common to all the microcomputers 205, 302, and 111 is selected as the broadcast communication rate RateB. Furthermore, the camera microcomputer 205 selects as the P2P communication rate RateP1 or RateP2 the highest communication rate among the communication rates common between itself and the adapter microcomputer 302 or the lens microcomputer 111. Thereby, the highest communication rate can be properly used for each of the broadcast communication and the P2P communication, and the high-speed communication that fully utilizes the communication performance of each microcomputer can be performed.

Referring now to flowcharts in FIGS. 13 and 17, a description will be given of communication rate correction processing for limiting the communication rate according to the number of accessory apparatuses (the interchangeable lens 100 and the adapter 300) connected to the camera 200. As illustrated in FIG. 1, the camera microcomputer 205 previously stores the connection number communication rate information 211 indicating the upper limit value (upper limit communication rate) of the communication rate according to the number of accessory apparatuses connected to the camera 200. The upper limit communication rate is the highest communication rate that ensures the stable communication for the number of connected accessory apparatuses. Based on the connection number communication rate information 211, the broadcast communication rate RateB and the P2P communication rates RateP1 and RateP2 are selected.

Figure 17:
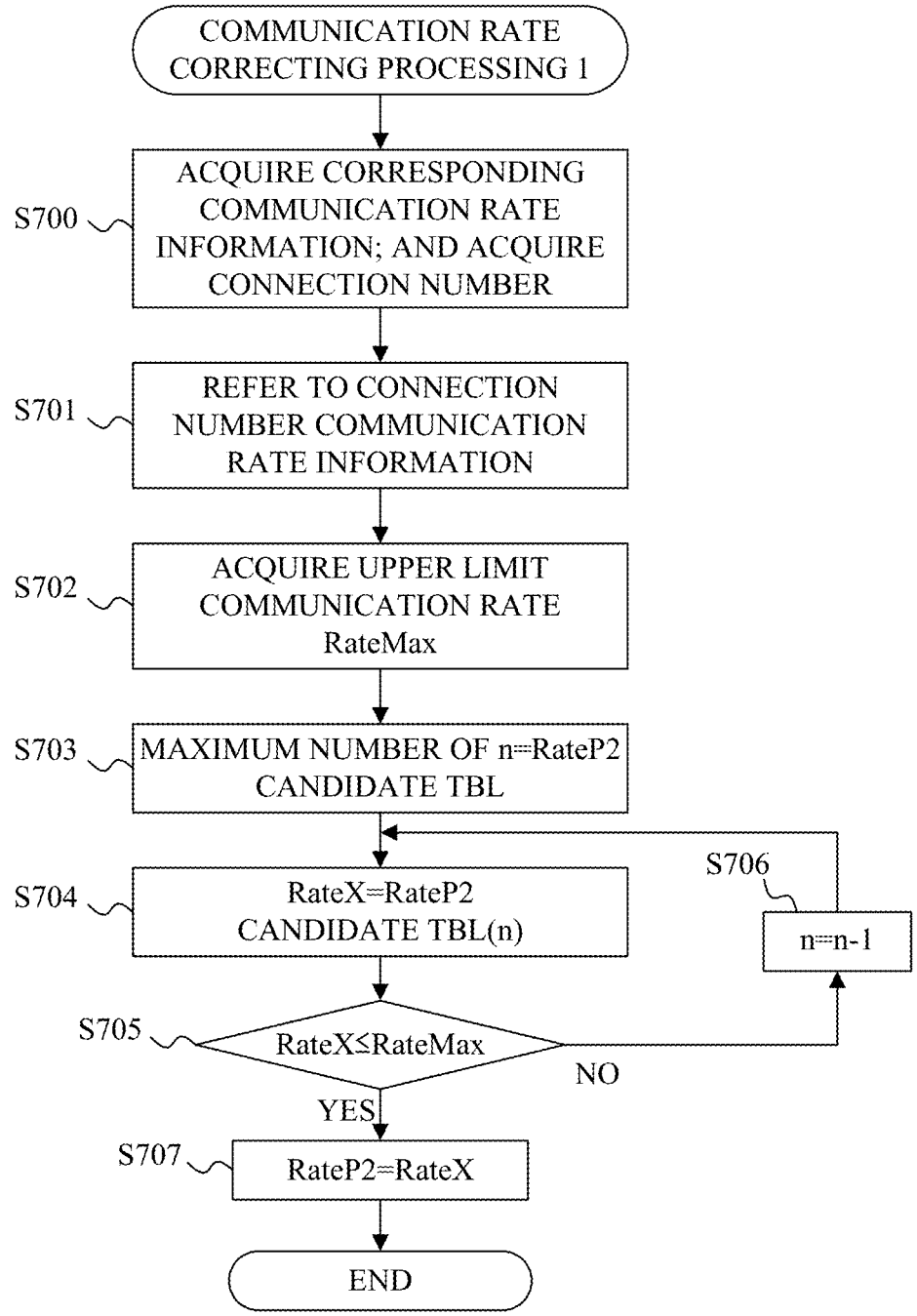
FIG. 17 is a flowchart illustrating connection number communication rate selecting processing according to the first embodiment.

FIG. 17 illustrates communication rate correcting processing for the P2P communication rate RateP2 with the lens microcomputer 111. In this processing, the camera microcomputer 205 provisionally selects, as the P2P communication rate RateP2, the highest communication rate among the common communication rates in the corresponding communication rate information 210 of its own and the corresponding communication rate information 132 of the lens microcomputer 111. Next, the camera microcomputer 205 acquires the upper limit communication rate corresponding to the actual number of connections of the accessory apparatuses to the camera 200 based on the connection number communication rate information 211. When the P2P communication rate RateP2 provisionally selected in the pre-processing exceeds the upper limit communication rate, the camera microcomputer 205 corrects the provisionally selected P2P communication rate RateP2.

First, in the step S700, the camera microcomputer 205 acquires the corresponding communication rate information from the interchangeable lens 100 and the adapter 300 that are all accessory apparatuses connected to the camera 200 by the initial communication process described above. Moreover, the camera microcomputer 205 acquires the number of accessory apparatuses connected to the communication lines CS and DATA. Next, in the step S701, the camera microcomputer 205 acquires an upper limit communication rate RateMax corresponding to the number of connections from the connection number communication rate information 211. In this embodiment, since the number of connections is 2, in the step S702, the camera microcomputer 205 acquires 15 Mbps which is the upper limit communication rate RateMax corresponding to the number of connections 2 from the connection number communication rate information illustrated in FIG. 13.

Next, in the step S703, the camera microcomputer 205 determines a table number for referring to the P2P communication rate RateP2 candidate list (referred to as a RateP2 candidate list hereinafter) created by the above selection processing of the P2P communication rate RateP2. A description will now be given of a case where a lower common communication rate is registered in the RateP2 candidate list as the table number is smaller. The camera microcomputer 205 sets the value of the maximum table number of the candidate list to the reference table number n in order to acquire the highest common communication rate in the RateP2 candidate list. Since the maximum table number is 4 in the RateP2 candidate list illustrated in FIG. 13, n=4 is set.

In the step S704, the camera microcomputer 205 that has set the reference table number n acquires the common communication rate corresponding to the reference table number n from the RateP2 candidate list and registers it as a communication rate candidate RateX.

Next, in the step S705, the camera microcomputer 205 determines whether the communication rate candidate RateX is faster than the upper limit communication rate RateMax. If the communication rate candidate RateX is faster than the upper limit communication rate RateMax, the camera microcomputer 205 proceeds to the step S706. In the step S706, the camera microcomputer 205 decrements the reference table number n by one in order to obtain the next highest communication rate among the common communication rates registered in the RateP2 candidate list. Then, the camera microcomputer 205 returns to the step S704, acquires the common communication rate corresponding to the reference table number n from the RateP2 candidate list, and registers it as the communication rate candidate RateX.

By repeating the processing of the steps S704 to S706 in this way, the camera microcomputer 205 acquires the communication rate candidate RateX that is equal to or lower than the upper limit communication rate RateMax. In the step S707, the camera microcomputer 205 selects the communication rate candidate RateX as the P2P communication rate RateP2 between the camera microcomputer 205 and the lens microcomputer 111. In the example of FIG. 13, 20 Mbps is selected as RateP2 before the correction processing, but 10 Mbps, which is lower than 20 Mbps, is selected as the corrected P2P communication rate RateP2 due to the upper limit communication rate RateMax=15 Mbps.

By the above correction processing, the highest communication rate corresponding to the number of accessory apparatuses connected to the camera 200 is selected as the P2P communication rate. Thereby, an appropriate P2P communication rate is selected for a communication load that varies depending on the number of connected accessory apparatuses, and the stable communication of the camera system can be ensured.

Figure 18:
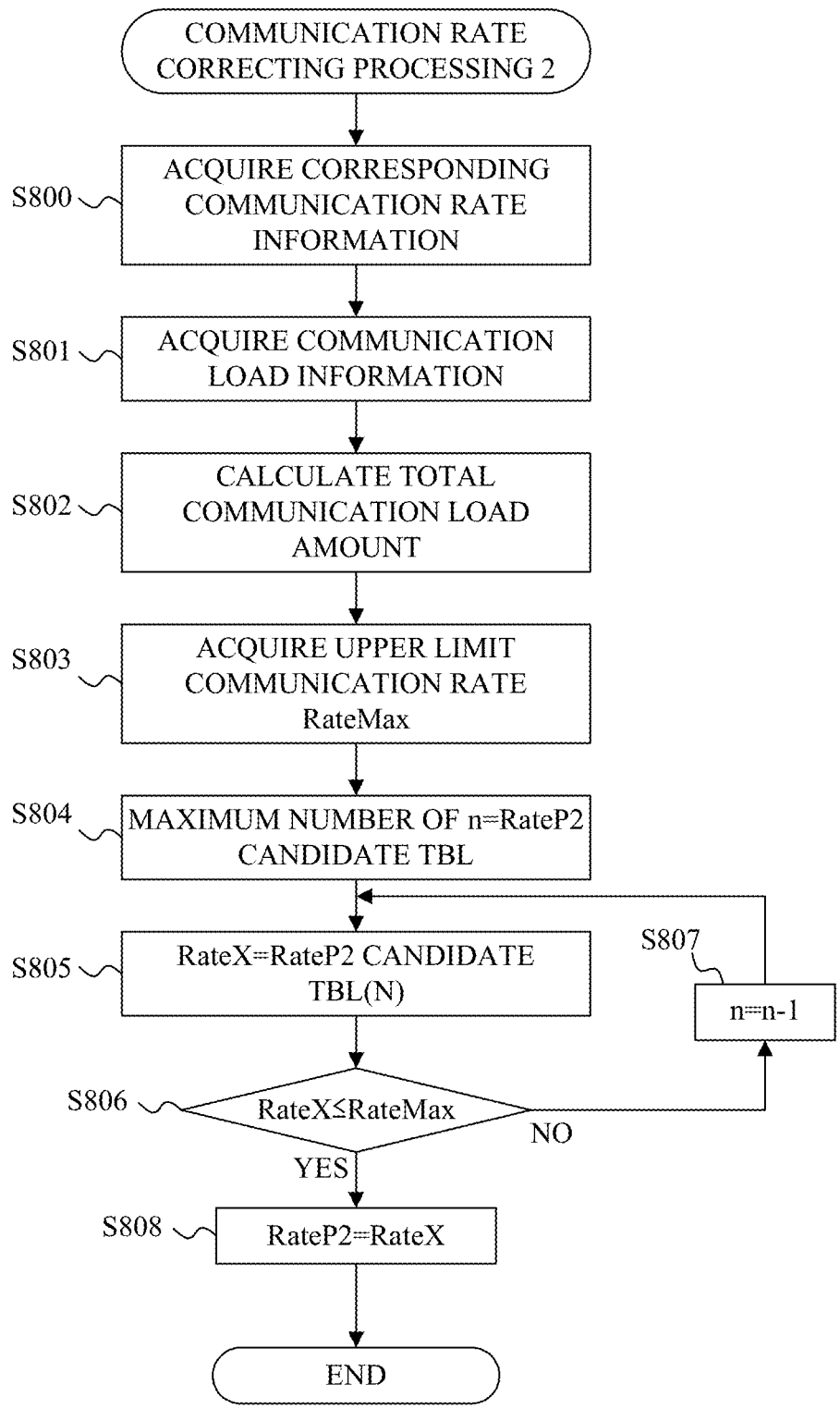
FIG. 18 is a flowchart illustrating load communication rate selecting processing according to the first embodiment.

Referring now to FIGS. 14 and 18, a description will be given of the communication rate correcting processing for limiting the communication rate according to the communication load of the accessory apparatuses (the interchangeable lens 100 and the adapter 300) connected to the camera 200.

As illustrated in FIG. 1, the camera microcomputer 205 previously stores the load communication rate information 212 indicating the upper limit value (upper limit communication rate) of the communication rate according to the communication load of the accessory apparatus connected to the camera 200. The upper limit communication rate is the highest communication rate at which the stable communication is ensured in the communication circuit including the connected accessory apparatus. Each of the lens microcomputer 111 and the adapter microcomputer 302 previously stores the communication load information 133 and 305 indicating the communication load amount of its own communication circuit. The communication load information will be described later. The camera microcomputer 205 selects the broadcast communication rate RateB and the P2P communication rates RateP1 and RateP2 based on the load communication rate information 212.

FIG. 18 illustrates the communication rate correction processing for the P2P communication rate RateP2 with the lens microcomputer 111. In this processing, the camera microcomputer 205 provisionally selects, as the P2P communication rate RateP2, the highest communication rate among the common communication rates in the corresponding communication rate information 210 of its own and the corresponding communication rate information 132 of the lens microcomputer 111. Next, the camera microcomputer 205 acquires the upper limit communication rate corresponding to the P2P communication rate RateP2 provisionally selected from the load communication rate information 212. When the P2P communication rate RateP2 provisionally selected in the preprocess exceeds the upper limit communication rate, the camera microcomputer 205 corrects the provisionally selected P2P communication rate RateP2.

In the step S800, the camera microcomputer 205 acquires the corresponding communication rate information from the interchangeable lens 100 and the adapter 300 that are all accessory apparatuses connected to the camera 200, by the initial communication processing described above. In addition, the camera microcomputer 205 acquires the communication load information from the interchangeable lens 100 and the adapter 300 in the step S801.

Next, in the step S802, the camera microcomputer 205 calculates a total communication load amount using the communication load information acquired from the lens microcomputer 111 and the adapter microcomputer 302. The total communication load amount is a communication load amount of the entire communication circuit in a state where the interchangeable lens 100 and the adapter 300 are connected to the camera 200.

Next, in the step S803, the camera microcomputer 205 acquires the upper limit communication rate RateMax corresponding to the total communication load amount calculated in the step S803 from the load communication rate information 212.

FIG. 14 illustrates illustrative load communication rate information. In general, the factor that hinders an increase in the communication rate in the communication circuit is a communication load amount generated in the communication circuit. In determining the upper limit communication rate of the communication circuit, it is necessary to previously clarify the communication load amount (total communication load amount) of the entire communication circuit. However, in a communication system (camera system) to which a plurality of arbitrary accessory apparatuses are connectable, this total communication load amount is not uniquely determined.

Therefore, in this embodiment, the camera microcomputer 205 as the communication master stores the load communication rate information 212, and determines the upper limit communication rate of the entire communication circuit of the communication load information 133 and 305 stored in the lens microcomputer 111 and the adapter microcomputer 302 as the communication slaves.

The communication load information 133 and 305 stored in the lens microcomputer 111 and the adapter microcomputer 302 includes load characteristic information indicating a communication load amount such as a resistance component and a capacitance component in each communication circuit. When the wiring length is long or the number of circuit protection elements is large, the amount of communication load increases.

The total communication load amount calculated by the camera microcomputer 205 is obtained by a simple sum of the load amounts of the adapter 300 and the interchangeable lens 100 connected to the camera 200. Since the load amount of the adapter 300 is 150 and the communication load amount of the interchangeable lens 100 is 170 in the example illustrated in FIG. 14, the total communication load amount is 320. However, the total communication load amount may be calculated by multiplying the simple sum by a coefficient according to the type and characteristic of the accessory apparatus connected to the camera 200.

The load communication rate information 212 stored in the camera microcomputer 205 includes the upper limit communication rate for each total communication load amount. The upper limit communication rate becomes lower as the total communication load amount increases. The camera microcomputer 205 acquires the upper limit communication rate RateMax=5 Mbps corresponding to the total communication load amount 320 from the load communication rate information 212. The upper limit communication rate RateMax corresponding to the total communication load amount is thus acquired.

This upper limit communication rate RateMax is applied to both the broadcast communication rate RateB and the P2P communication rates RateP1 and RateP2. The camera microcomputer 205 selects the broadcast communication rate RateB and the P2P communication rates RateP1 and RateP2 within a range not exceeding the upper limit communication rate RateMax.

Next, in the step S804, the camera microcomputer 205 determines a table number for referring to the RateP2 candidate list created by the above selection processing of the P2P communication rate RateP2. A description will now be given of a case where a lower common communication rate is registered in the RateP2 candidate list as the table number is smaller. The camera microcomputer 205 sets the value of the maximum table number in the candidate list to the reference table number n in order to acquire the highest common communication rate in the RateP2 candidate list. Since the maximum table number is 4 in the RateP2 candidate list illustrated in FIG. 13, n=4 is set. In the step S805, the camera microcomputer 205 that has set the reference table number n acquires the common communication rate corresponding to the reference table number n from the RateP2 candidate list and registers it as the communication rate candidate RateX.

Next, in the step S806, the camera microcomputer 205 determines whether the communication rate candidate RateX is faster than the upper limit communication rate RateMax. If the communication rate candidate RateX is faster than the upper limit communication rate RateMax, the camera microcomputer 205 proceeds to the step S807. In the step S807, the camera microcomputer 205 decrements the reference table number n by one in order to acquire the next highest communication rate among the common communication rates registered in the RateP2 candidate list. Then, the camera microcomputer 205 returns to the step S805, acquires the barrel communication rate corresponding to the reference table number n from the RateP2 candidate list, and registers it as the communication rate candidate RateX.

Thus, by repeating the processing of the steps S805 to S807, the camera microcomputer 205 acquires the communication rate candidate RateX that is equal to or lower than the upper limit communication rate RateMax. In the step S808, the camera microcomputer 205 selects the communication rate candidate RateX as the P2P communication rate RateP2 between the camera microcomputer 205 and the lens microcomputer 111. In the example in FIGS. 13 and 14, 20 Mbps is selected as RateP2 before the correction processing, but 5 Mbps, which is lower than 20 Mbps by two stages, is selected as the corrected P2P communication rate RateP2 due to the upper limit communication rate RateMax=5 Mbps.

By the above correction processing, the highest communication rate corresponding to the total communication load amount of the accessory apparatus connected to the camera 200 is selected as the P2P communication rate. Thereby, an appropriate P2P communication rate is selected for a communication load that varies depending on the connected accessory apparatus, and the communication stability of the camera system can be ensured.

The above two types of correction processing are similarly applicable to the P2P communication rate RateP1 with the adapter microcomputer 302.

When the camera microcomputer 205 cannot acquire the communication load information from any of the accessory apparatuses in the step S801, the camera microcomputer 205 sets the same communication rate as the broadcast communication rate for the P2P communication rate with the accessory apparatus for which the information has not been able to be acquired. If the camera microcomputer 205 cannot acquire the corresponding communication rate information from any of the accessory apparatuses in the step S800, the camera microcomputer 205 sets the broadcast communication rate and the P2P communication rate with the accessory apparatus for which the information has not been able to be acquired to the initial communication rate. Thereby, even when an accessory apparatus that does not comply with the communication specifications required by the camera 200 is connected, the stable communication for the camera system can be realized.

The embodiment described above can be used in combination with another communication channel in addition to the communication channel including the notification channel CS and the data communication channel DATA.

Figure 19:
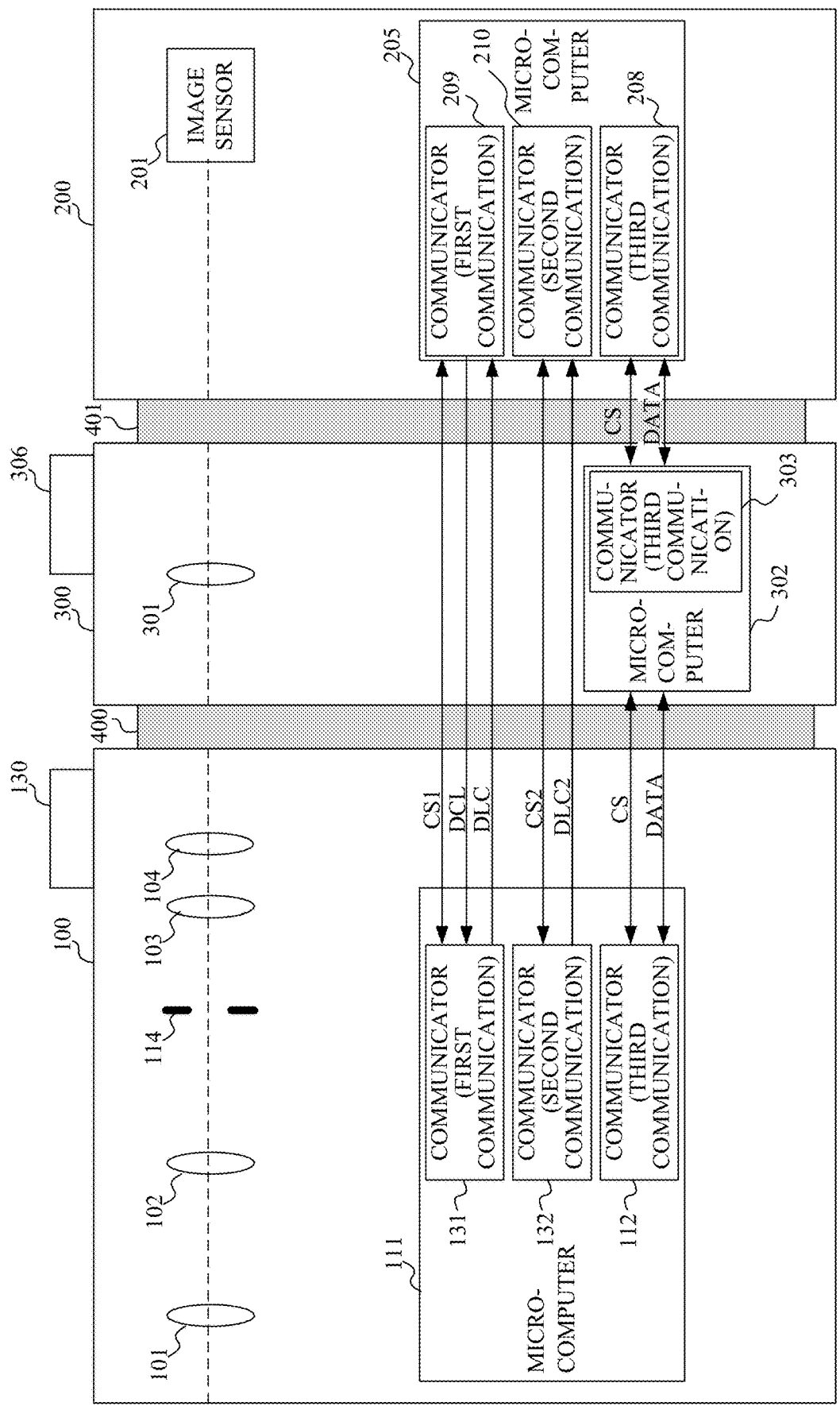
FIG. 19 is a diagram illustrating another communication channel.

An example thereof will be described with reference to FIG. 19. In FIG. 19, those elements which are corresponding elements in FIG. 1 will be designated by the same reference numerals, and a duplicate description thereof will be omitted. Moreover, FIG. 19 omits an illustration of part of components described in FIG. 1. The notification channel CS and the data communication channel DATA described above are communication lines for a communication called a third communication. In the third communication, when the operation member 306 is operated by the user, the adapter microcomputer 302 and the camera microcomputer 205 communicate the fact of the operation and the operational amount between them. Even when the operation member 130 is operated by the user, the communication may be performed between the lens microcomputer 111 and the camera microcomputer 205 using the third communication line.

The lens microcomputer 111 controls the communicator 131 for the first communication and the communicator 132 for the second communication, in addition to the communicator 112. In addition to the communicator 112, the camera microcomputer 205 controls the communicator 209 for the first communication and the communicator 210 for the second communication.

A description will now be given of the first communication. The first communication is a communication performed via the communicators 131 and 209. The communicator 131 following an instruction from the lens microcomputer 111 and the communicator 209 following an instruction from the camera microcomputer 205 communicate with each other via a notification channel CS1, a data communication channel DCL, and a data communication channel DLC. The communicators 131 and 209 set the voltage level of the notification channel CS1, the communication rate (data amount per unit time) and communication voltage in the asynchronous communication. In response to an instruction from the lens microcomputer 111 or the camera microcomputer 205, data is transmitted and received via the data communication channel DCL and the data communication channel DLC.

The notification channel CS1 is a signal line used to notify a communication request from the camera 200 to the interchangeable lens 100 or the like. The data communication channel DCL is a channel used when data is transmitted from the camera 200 to the interchangeable lens 100, and the data communication channel DLC is a channel used when data is transmitted from the interchangeable lens 100 to the camera 200.

In the first communication, the camera microcomputer 205 and the lens microcomputer 111 communicate with each other by a clock synchronous communication or asynchronous communication. An initial communication performed when the interchangeable lens 100 is connected to the camera 200 is also made initially by the first communication. The camera microcomputer 205 and the lens microcomputer 111 communicate identification information of the interchangeable lens 100, and when it is determined that the interchangeable lens 100 mounted on the camera 200 is compatible with the asynchronous communication, the communication method is changed from the clock synchronization communication to the asynchronous communication. As a result of the communication of the identification information, the camera microcomputer 205 may identify whether or not the interchangeable lens 100 is compatible with the third communication that performs the communication including the adapter 300. When determining that the interchangeable lens 100 is compatible with the third communication, the camera microcomputer 205 may perform the authentication communication for recognizing the interchangeable lens 100 and the intermediate adapter 300 via the P2P communication.

Next follows a description of the second communication. The second communication is a one-way communication from the interchangeable lens 100 to the camera 200. The second communication is performed via the communicators 132 and 210. The communicator 132 following an instruction from the lens microcomputer 111 and the communicator 210 following an instruction from the camera microcomputer 205 communicate with each other via a notification channel CS2 and a data communication channel DLC2. The camera communicator 208 and the lens communicator 118 transmit and receive data by the clock synchronous communication or asynchronous communication. By using the data communication channel DLC2 of the second communication channel together with the data communication channel DLC of the first communication, it becomes possible to transmit a large amount of data from the interchangeable lens 100 to the camera 200 in a short time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can provide a communication between a camera and a specific accessory apparatus as fast as possible while a variety of accessory apparatuses having different usable communication rates are connected to the camera.

What is claimed is:

1. A camera usable while a plurality of accessory apparatuses are connected to the camera, the camera comprising a camera controller configured to control a communication with the plurality of accessory apparatuses using a signal transmission channel used for a signal transmission between the camera and the plurality of accessory apparatuses, and a data communication channel used for a data communication between the camera and the plurality of accessory apparatuses, wherein the camera controller is configured to provide, using the data communication channel, a first communication for performing a data communication with the plurality of accessory apparatuses, and a second communication for performing a data communication individually with a specific accessory apparatus designated as a communication counterpart by the first communication, outputs, to the signal transmission channel, a signal for instructing switching from the first communication to the second communication, performs the first communication at a first communication rate commonly usable for the camera and the plurality of accessory apparatuses, and performs the second communication at a second communication rate commonly usable for the camera and the specific accessory apparatus and equal to or higher than the first communication rate, wherein the camera controller performs the first communication at an initial communication rate determined between the camera and the plurality of accessory apparatuses and acquires usable communication rate information indicating a usable communication rate from each of the plurality of accessory apparatuses, and sets the first communication rate and the second communication rate corresponding to each of the plurality of accessory apparatuses, using the usable communication rate information.

2. The camera according to claim 1, wherein the camera controller sets the first communication rate to the highest communication rate among communication rates commonly usable for the plurality of accessory apparatuses.

3. The camera according to claim 1, wherein the camera controller sets the second communication rate to the highest communication rate commonly usable for the camera controller and the specific accessory apparatus.

4. The camera according to claim 1, wherein the camera controller instructs the specific accessory apparatus to execute the second communication and to change the first communication rate to the second communication rate by transmitting the same signal in the signal transmission channel.

5. The camera according to claim 1, wherein the camera controller notifies the plurality of accessory apparatuses of the first communication rate, and notifies the accessory apparatus corresponding to the second communication rate of the second communication rate.

6. The camera according to claim 1, wherein the initial communication rate is higher than the first communication rate.

7. The camera according to claim 1, wherein the camera controller acquires information on the number of the plurality of accessory apparatuses and sets the second communication rate according to the number.

8. The camera according to claim 1, wherein the camera controller acquires information indicating a communication load from each of the plurality of accessory apparatuses, and sets the second communication rate using information indicating the communication load of the plurality of accessory apparatuses.

9. The camera according to claim 8, wherein the camera controller sets the first communication rate and the second communication rate to be equal to each other when the plurality of accessory apparatuses include an accessory apparatus that does not have information indicating the communication load.

10. An accessory apparatus among a plurality of accessory apparatuses connectable to a camera usable while the plurality of accessory apparatuses are connected to the camera, the accessory apparatus comprising an accessory controller configured to control a communication with the camera using a signal transmission channel used for a signal transmission between the camera and the plurality of accessory apparatuses, and a data communication channel used for a data communication between the camera and the plurality of accessory apparatuses, and wherein the accessory controller is configured to perform a first communication for performing a data communication performed between the camera and the plurality of accessory apparatuses, and a second communication for performing a data communication individually with the camera when the accessory apparatus is designated as a specific accessory apparatus that is a communication counterpart by the first communication, detects a signal output from the camera to the signal transmission channel and instructing switching from the first communication to the second communication, performs the first communication at a first communication rate commonly usable for the camera and the plurality of accessory apparatuses, and performs the second communication at a second communication rate commonly usable for the camera and the accessory apparatus and equal to or higher than the first communication rate, wherein the accessory controller performs the first communication at an initial communication rate determined between the camera and the plurality of accessory apparatuses, and transmits to the camera usable communication rate information indicating a communication rate usable by the accessory controller, and receives a notification at the first communication rate and the second communication rate when the accessory apparatus is designated as the specific accessory, determined by the camera using the usable communication rate information acquired from each of the plurality of accessory apparatuses.

11. The accessory apparatus according to claim 10, wherein when the accessory controller, when designated as the specific accessory apparatus, is instructed to execute the second communication and to change the first communication rate to the second communication rate by transmitting the same signal in the signal transmission channel.

12. The accessory apparatus according to claim 11, wherein the accessory controller transmits information indicating the communication load of the accessory apparatus to the camera, and receives a notification at the second communication rate selected by the camera using information indicating the communication load acquired from each of the plurality of accessory apparatuses.

13. A control method of a camera usable while a plurality of accessory apparatuses are connected to the camera that is connected to a signal transmission channel used for a signal transmission between the camera and the plurality of accessory apparatuses, and a data communication channel used for a data communication between the camera and the plurality of accessory apparatuses, the control method comprising the steps of:

causing the camera to provide a first communication for performing a data communication with the plurality of accessory apparatuses using the data communication channel; and causing the camera to provide a second communication for performing a data communication individually with a specific accessory apparatus designated as a communication counterpart by the first communication using the data communication channel, wherein a signal for instructing switching from the first communication to the second communication is output to the signal transmission channel, wherein the first communication is performed at a first communication rate commonly usable for the camera and the plurality of accessory apparatuses, wherein the second communication is performed at a second communication rate commonly usable for the camera and the specific accessory apparatus and equal to or higher than the first communication rate, wherein the first communication is performed at an initial communication rate determined between the camera and the plurality of accessory apparatuses and usable communication rate information indicating a usable communication rate is acquired from each of the plurality of accessory apparatuses, and wherein the first communication rate and the second communication rate corresponding to each of the plurality of accessory apparatuses are set using the usable communication rate information.

14. A control method of an accessory apparatus among a plurality of accessory apparatuses connectable to a camera usable while the plurality of accessory apparatuses are connected to the camera, the accessory apparatus being connected to a signal transmission channel used for a signal transmission between the camera and the plurality of accessory apparatuses, and a data communication channel used for a data communication between the camera and the plurality of accessory apparatuses, the control method comprising the steps of:
  causing the accessory apparatus to perform a first communication performed between the camera and the plurality of accessory apparatuses using the data communication channel, and
  causing the accessory apparatus to perform a second communication for a data communication individually with the camera when the accessory apparatus is designated as a specific accessory apparatus that is a communication counterpart by the first communication, wherein the accessory apparatus is caused to detect a signal output from the camera to the signal transmission channel and instructing switching from the first communication to the second communication, wherein the accessory apparatus is caused to perform the first communication at a first communication rate commonly usable for the camera and the plurality of accessory apparatuses, wherein the accessory apparatus is caused to perform the second communication at a second communication rate commonly usable for the camera and the accessory apparatus and equal to or higher than the first communication rate, wherein the accessory apparatus is caused to perform the first communication at an initial communication rate determined between the camera and the plurality of accessory apparatuses, and transmit to the camera usable communication rate information indicating a communication rate usable by the accessory controller, and wherein the accessory apparatus is caused to receive a notification at the first communication rate and the second communication rate when the accessory apparatus is designated as the specific accessory, determined by the camera using the usable communication rate information acquired from each of the plurality of accessory apparatuses.

15. A non-transitory computer-readable storage medium storing a communication control program that is a computer program that causes a computer in a camera to execute processing, the camera being usable while a plurality of accessory apparatuses are connected to the camera, and connected to a signal transmission channel used for a signal transmission between the camera and the plurality of accessory apparatuses, and a data communication channel used for a data communication between the camera and the plurality of accessory apparatuses, the processing causing the computer to
  provide a first communication for performing a data communication with the plurality of accessory apparatuses using the data communication channel; and
  provide a second communication for performing a data communication individually with a specific accessory apparatus designated as a communication counterpart by the first communication using the data communication channel, wherein a signal for instructing switching from the first communication to the second communication is output to the signal transmission channel, wherein the first communication is performed at a first communication rate commonly usable for the camera and the plurality of accessory apparatuses, wherein the second communication is performed at a second communication rate commonly usable for the camera and the specific accessory apparatus and equal to or higher than the first communication rate, wherein the first communication is performed at an initial communication rate determined between the camera and the plurality of accessory apparatuses and usable communication rate information indicating a usable communication rate is acquired from each of the plurality of accessory apparatuses, and wherein the first communication rate and the second communication rate corresponding to each of the plurality of accessory apparatuses are set using the usable communication rate information.

16. A non-transitory computer-readable storage medium storing a communication control program that is a computer program that causes a computer in an accessory apparatus to execute processing among a plurality of accessory apparatuses connectable to a camera usable while the plurality of accessory apparatuses connected to the camera, the accessory apparatus being connected to a signal transmission channel used for a signal transmission between the camera and the plurality of accessory apparatuses, and a data communication channel used for a data communication between the camera and the plurality of accessory apparatuses, and the processing causing the computer to
  perform a first communication performed between the camera and the plurality of accessory apparatuses using the data communication channel, and
  perform a second communication for a data communication individually with the camera when the accessory apparatus is designated as a specific accessory apparatus that is a communication counterpart by the first communication, wherein the accessory apparatus is caused to detect a signal output from the camera to the signal transmission channel and instructing switching from the first communication to the second communication, wherein the accessory apparatus is caused to perform the first communication at a first communication rate commonly usable for the camera and the plurality of accessory apparatuses, wherein the accessory apparatus is caused to perform the second communication at a second communication rate commonly usable for the camera and the accessory apparatus and equal to or higher than the first communication rate, wherein the accessory apparatus is caused to perform the first communication at an initial communication rate determined between the camera and the plurality of accessory apparatuses, and transmit to the camera usable communication rate information indicating a communication rate usable by the accessory controller, and wherein the accessory apparatus is caused to receive a notification at the first communication rate and the second communication rate when the accessory apparatus is designated as the specific accessory, determined by the camera using the usable communication rate information acquired from each of the plurality of accessory apparatuses.

17. A camera system comprising a camera usable while the plurality of accessory apparatuses are connected to the camera, and at least one accessory apparatus among the plurality of accessory apparatuses, wherein the camera includes a camera controller configured to control a communication with the plurality of accessory apparatuses using a signal transmission channel used for a signal transmission between the camera and the plurality of accessory apparatuses, and a data communication channel used for a data communication between the camera and the plurality of accessory apparatuses, wherein the accessory apparatus includes an accessory controller configured to control a communication with the camera using the signal transmission channel and the data communication channel, wherein the camera controller is configured to provide, using the data communication channel, a first communication for performing a data communication with the plurality of accessory apparatuses, and a second communication for performing a data communication individually with a specific accessory apparatus designated as a communication counterpart by the first communication, and outputs, to the signal transmission channel, a signal for instructing switching from the first communication to the second communication, wherein the accessory controller is configured to perform the first communication and the second communication when the accessory apparatus is designated as a specific accessory apparatus that is a communication counterpart by the first communication, and detects a signal output from the camera controller to the signal transmission channel and instructing switching from the first communication to the second communication, and wherein the camera controller and the accessory controller perform the first communication at a first communication rate commonly usable for the camera and the plurality of accessory apparatuses, and perform the second communication at a second communication rate commonly usable for the camera and the accessory apparatus and equal to or higher than the first communication rate, wherein the camera controller performs the first communication at an initial communication rate determined between the camera and the plurality of accessory apparatuses and acquires usable communication rate information indicating a usable communication rate from each of the plurality of accessory apparatuses, and sets the first communication rate and the second communication rate corresponding to each of the plurality of accessory apparatuses, using the usable communication rate information, and wherein the accessory controller performs the first communication at the initial communication rate, and transmits to the camera usable communication rate information indicating a communication rate usable by the accessory controller, and receives a notification at the first communication rate and the second communication rate when the accessory apparatus is designated as the specific accessory, determined by the camera using the usable communication rate information acquired from each of the plurality of accessory apparatuses.

* * * * *